United States Patent
Fujiwara

(10) Patent No.: US 12,299,924 B2
(45) Date of Patent: May 13, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Chika Fujiwara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 452 days.

(21) Appl. No.: 17/751,997

(22) Filed: May 24, 2022

(65) Prior Publication Data

US 2022/0392106 A1    Dec. 8, 2022

(30) Foreign Application Priority Data

May 31, 2021    (JP) ................... 2021-091223

(51) Int. Cl.
| | | |
|---|---|---|
| *G06T 7/70* | (2017.01) | |
| *G06T 7/60* | (2017.01) | |
| *G06T 7/73* | (2017.01) | |
| *G06V 10/60* | (2022.01) | |
| G06F 3/0482 | (2013.01) | |

(52) U.S. Cl.
CPC .............. *G06T 7/74* (2017.01); *G06T 7/60* (2013.01); *G06V 10/60* (2022.01); *G06F 3/0482* (2013.01); *G06T 2200/24* (2013.01)

(58) Field of Classification Search
CPC ......... G06T 7/74; G06T 7/60; G06T 2200/24; G06V 10/60; G06F 3/0482
USPC ........................................................ 382/103
See application file for complete search history.

(56) References Cited

U.S. PATENT DOCUMENTS

| | | | |
|---|---|---|---|
| 2020/0007754 A1* | 1/2020 | Imai ...................... G02B 5/20 |
| 2021/0174541 A1 | 6/2021 | Fujiwara | |

FOREIGN PATENT DOCUMENTS

| | | |
|---|---|---|
| JP | 2003-91726 A | 3/2003 |
| JP | 2017-134561 A | 8/2017 |

* cited by examiner

*Primary Examiner* — Michael R Neff
(74) *Attorney, Agent, or Firm* — Carter, DeLuca & Farrell LLP

(57) ABSTRACT

An image processing apparatus includes: a first obtainment unit configured to obtain a plurality of captured images of an object captured under a plurality of image capture conditions; a second obtainment unit configured to obtain information on a material of the object; and an estimation unit configured to estimate a distribution of normals of the object based on the plurality of captured images and the information on the material.

19 Claims, 17 Drawing Sheets

| OBJECT MATERIAL | OBJECT ATTRIBUTE P |
|---|---|
| PAPER | 1 |
| LEATHER | 2 |
| METAL | 3 |
| ⋮ | ⋮ |

FIG.6

IMAGE PROCESSING APPARATUS, IMAGE PROCESSING METHOD, AND STORAGE MEDIUM

BACKGROUND OF THE DISCLOSURE

Field of the Disclosure

The present disclosure relates to an image processing technique for estimating the distribution of normals.

Description of the Related Art

There is known a technique for creating a CG representation of an object using asperity information on the object. One method of expressing the asperity information on an object is to use the distribution of normals indicating the orientations of normals to the object on a unit area basis. Japanese Patent Laid-Open No. 2003-91726 describes estimating the distribution of normals to an object by using a reflection model that supports various kinds of objects. However, the derivation method of Japanese Patent Laid-Open No. 2003-91726 have so many parameters that the accuracy of the normals distribution lowers unless a sufficient number of observation values are obtained. Thus, as described in Japanese Patent Laid-Open No. 2017-134561, selecting a suitable reflection model from a plurality of reflection models can reduce parameters to estimate.

However, since the method of Japanese Patent Laid-Open No. 2017-134561 selects a reflection model based on luminance values, a reflection model is selected without consideration of the characteristics of the material of the object, which may consequently lower the accuracy of the normals distribution estimation.

SUMMARY OF THE DISCLOSURE

An image processing apparatus according to the present disclosure comprises: a first obtainment unit configured to obtain a plurality of captured images of an object captured under a plurality of image capture conditions; a second obtainment unit configured to obtain information on a material of the object; and an estimation unit configured to estimate a distribution of normals of the object based on the plurality of captured images and the information on the material.

Further features of the present disclosure will become apparent from the following description of exemplary embodiments with reference to the attached drawings.

BRIEF DESCRIPTION OF THE DRAWINGS

FIG. 6 is a diagram showing an example of a list showing the relations between object materials and object attributes:

DESCRIPTION OF THE EMBODIMENTS

Figure 1A:
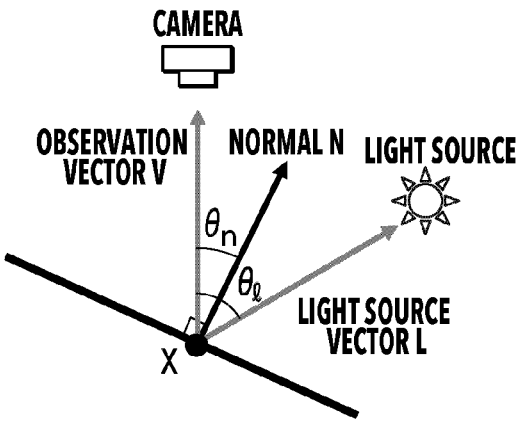
FIGS. 1A to 1D are diagrams showing an example of image capture conditions and how luminance changes relative to a light source angle.

Hereinbelow, embodiments of the technique of the present disclosure are described with reference to the drawings. Note that the following embodiments are not necessarily intended to limit the technique of the present disclosure. Also, not all the combinations of features described in the embodiments herein are necessarily essential to the solutions provided by the technique of the present disclosure. Note that the same reference numeral is used to denote and describe the same configuration.

First Embodiment

[Normals Distribution Estimation Based on a Reflection Model]

Before describing the present embodiment, a description is given of an example of how a normals distribution (distribution of normals) indicating the orientations of normals to an object on a unit area basis is estimated using a reflection model which is based on reflection properties and changes in luminance among captured images of the object.

FIGS. 1A to 1D are diagrams illustrating changes in luminance on a certain unit area. FIG. 1A is a diagram showing geometric conditions (image capture conditions) of an object surface, a camera (an image capturing apparatus), and a light source in this example. Herein, a unit vector indicating the direction from a position x on the object to the camera (an observation direction) is referred to as an observation vector V, a unit vector indicating a light source direction from the position x to the light source is referred to as a light source vector L, and a normal representing the orientation of the surface of the object at the position x is referred to as a normal vector N. Also, $\theta_n$ denotes the angle formed between the observation vector V and the normal vector N (hereinafter referred to as a normal angle), and 0l denotes the angle formed between the observation vector V and the light source vector L (hereinafter referred to as a light source angle).

Asperity information on an object is obtained by, for example, estimation of the distribution of normals to the object based on images captured by a camera placed to face in a direction toward the substantially planar object, such as grain leather or wood, which has fine asperities relative to the plane and has similar reflection properties on its entire surface. The distribution of normals, which represents information on a normal per unit area, is estimated as follows: based on a plurality of captured images obtained under a plurality of image capture conditions, namely, different light source angles $\theta_l$, luminance changes on each pixel are applied to a light reflection model. The plurality of captured images with different image capture conditions are obtained by, for example, capturing images while changing the position of the light source with the camera being fixed.

Figure 1B:
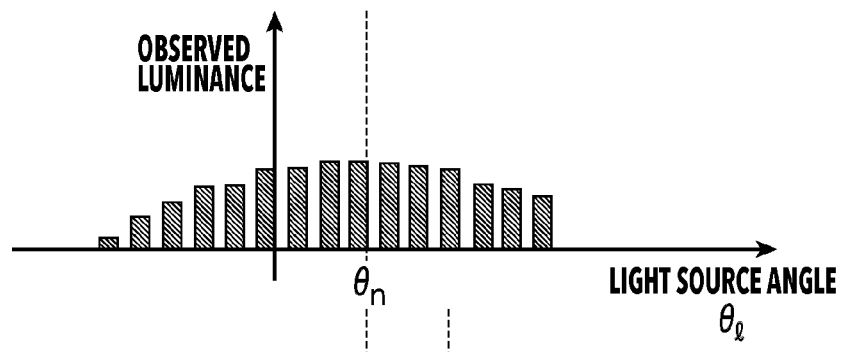
Figure 1C:
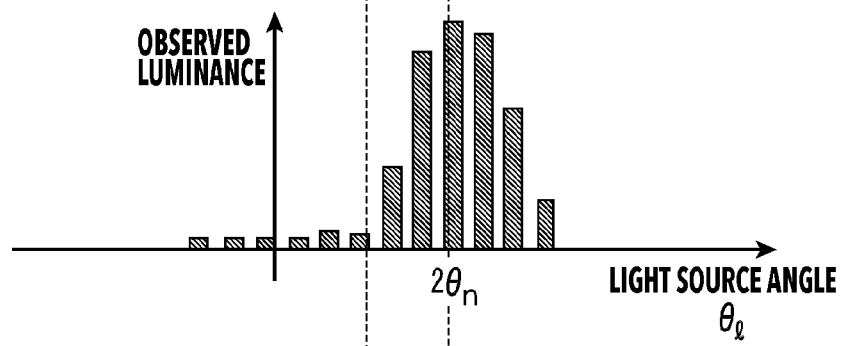
Figure 1D:
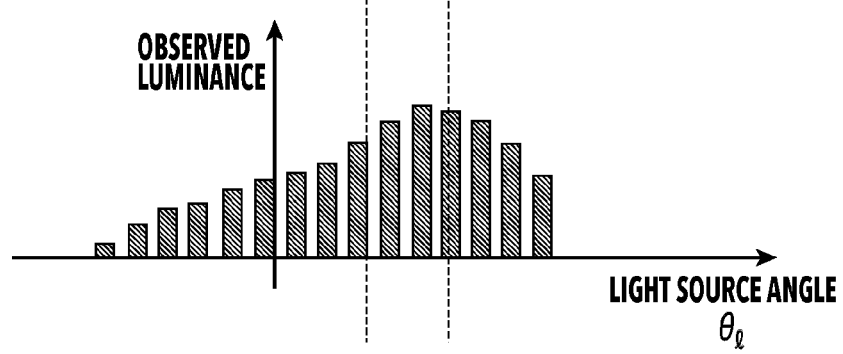

FIGS. 1B to 1D are graphs showing changes in luminance on the position x on images captured with only the light source angle $\theta_l$ of the geometric conditions in FIG. 1A being changed. FIG. 1B shows luminance changes in a case where the reflection properties of the object exhibit diffuse reflection. FIG. 1C shows luminance changes in a case the reflection properties of the object exhibit specular reflection. FIG. 1D shows luminance changes in a case the reflection properties of the object exhibit both diffuse reflection and specular reflection.

For a representation of the diffuse reflection, for example, a reflection model of Lambertian reflection is used. An observed luminance I is expressed by the following Formula (1):

$$I = ER_d \cos(\theta_l - \theta_n) \qquad \text{Formula (1)}$$

where E is the intensity of the light source and Rd is a diffuse reflectance.

In the above formula, $\theta_l - \theta_n$ represents the angle formed by the normal vector N and the light source vector L. According to Formula (1), the luminance I is the highest in a case where the normal angle $\theta_n$ and the light source angle $\theta_l$ equal. Hence, in a case where the reflection properties exhibit diffuse reflection, the luminance is the highest in a case where the normal vector N and the light source vector L equal. For this reason, the graph in FIG. 1B has the highest luminance at the point where the normal angle $\theta_n$ and the light source angle $\theta_l$ equal.

Next, for a representation of the specular reflection, the Blinn-Phong model that has a peak across the normal vector N in a specular direction, the Torrance-Sparrow model, or the like is used. In the Blinn-Phong model, the observed luminance I is expressed by the following Formula (2):

$$I = ER_s \cos^\alpha\left(\frac{\theta_l}{2} - \theta_n\right) \qquad \text{Formula (2)}$$

where E represents the intensity of the light source and Rs represents a specular reflectance.

In the above formula, "α" represents a gloss. The larger the gloss, the narrower the spread of the reflection light, indicating a high gloss.

In the above formula, "$\theta_l/2 - \theta_n$" is the angle formed between the normal vector N and a unit vector indicating a direction of a point halfway between the light source vector L and the observation vector V (referred to as a halfway vector H). According to Formula (2), in a case where the reflection properties exhibit specular reflection, the luminance is at the highest in a case where the light source angle $\theta_l$ is twice the normal angle $\theta_n$. For this reason, the graph in FIG. 1C has the highest luminance at the point where the light source angle $\theta_l$ is $2\theta_n$.

Reflection properties having both diffuse reflection and specular reflection are a combination of reflection properties with different light source angles $\theta_l$ at which the luminance is the highest. Thus, in a case of reflection properties having both diffuse reflection and specular reflection, as shown in FIG. 1D, the light source angle $\theta_l$ at which the luminance is the highest is offset from both of the normal angle $\theta_n$ and the double angle of the normal angle, $2\theta_n$.

In this way, the light source angle $\theta_l$ at which the luminance is the highest changes depending on the reflection properties of the object. Thus, the accuracy of normals distribution estimation lowers unless the normals distribution estimation is performed using a reflection model selected properly for the object.

To this end, in the present embodiment, a user designates the material of an object, and the distribution of normals that vary in each unit area is estimated using a reflection model based on that material. What is described in the present embodiment is a method for improving the accuracy of normals distribution estimation by selecting a reflection model suitable for the material of an object.

[Hardware Configuration of the Image Processing Apparatus]

Figure 2:
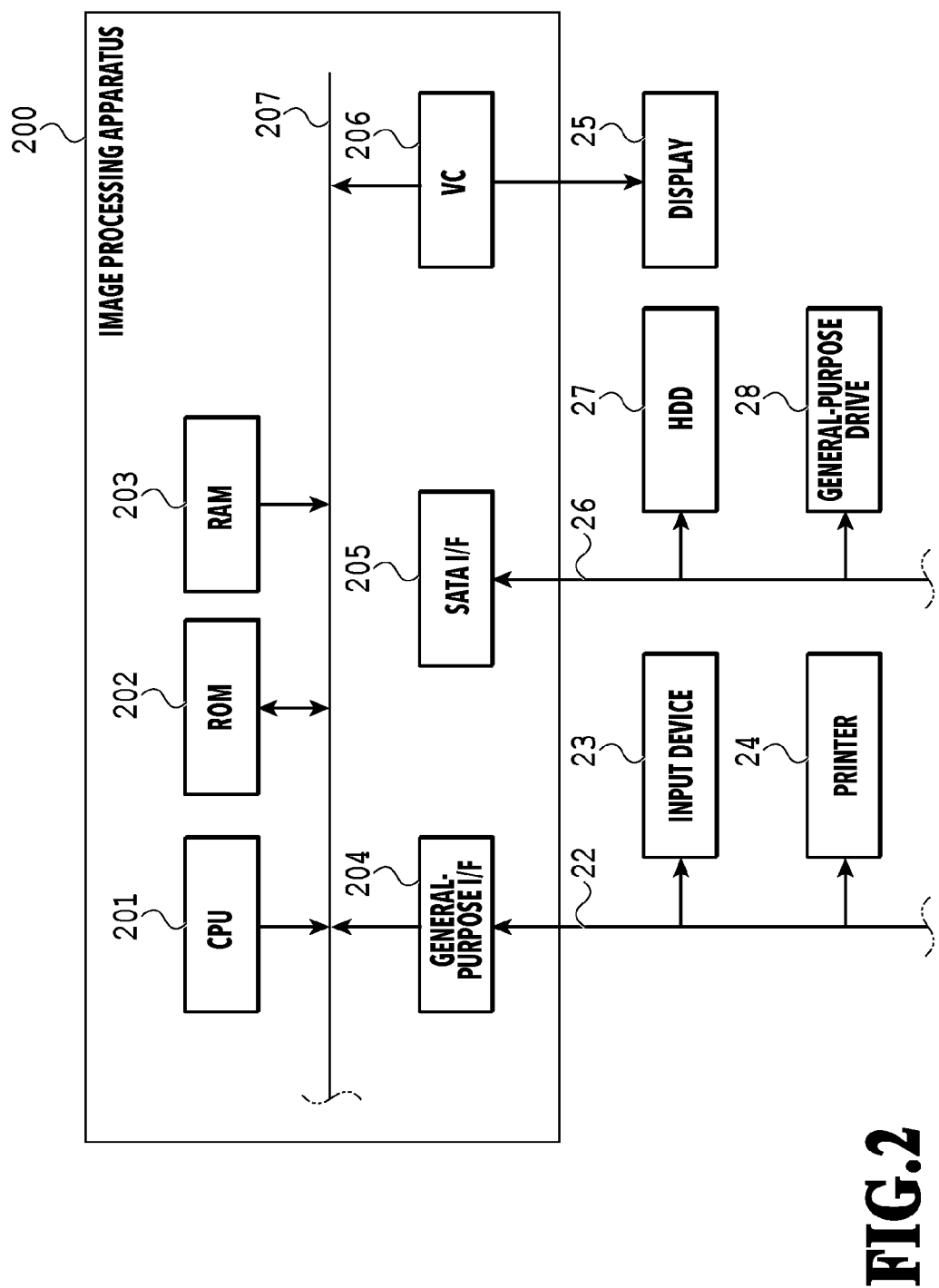
FIG. 2 is a diagram showing the hardware configuration of an image processing apparatus.

FIG. 2 is a block diagram showing the hardware configuration of an image processing apparatus of the present embodiment. An image processing apparatus 200 is implemented by an information processing apparatus such as, for example, a computer.

The image processing apparatus 200 has a CPU 201, a ROM 202, a RAM 203, a general-purpose interface (I/F) 204, a Serial AT Attachment (SATA) I/F 205, and a video card (VC) 206.

The CPU 201 executes an operating system (OS) or various programs stored in the ROM 202, a hard disk drive (HDD) 27, or the like using the RAM 203 as a work memory. The CPU 201 also controls each configuration via a system bus 207. Note that, for example, the processing in the flowcharts to be described later is executed by the CPU 201 by loading program code stored in the ROM 202, the HDD 27, or the like into the RAM 203.

An input device 23 such as a mouse or a keyboard and a printer 24 are connected to the general-purpose I/F 204 via a serial bus 22. A general-purpose drive 28 that writes/reads the HDD 27 and various recording media is connected to the SATA I/F 205 via a serial bus 26. The CPU 201 uses the HDD 27 and various recording media mounted in the general-purpose drive 28 as places to store various kinds of data.

A display 25 as a display unit is connected to the VC 206. The CPU 201 also functions as a display control means that displays, on the display 25, a user interface (UI) screen provided by the programs. The CPU 201 also receives input information representing a user instruction via the input device 23.

[Functional Configuration of the Image Processing Apparatus]

Figure 3:
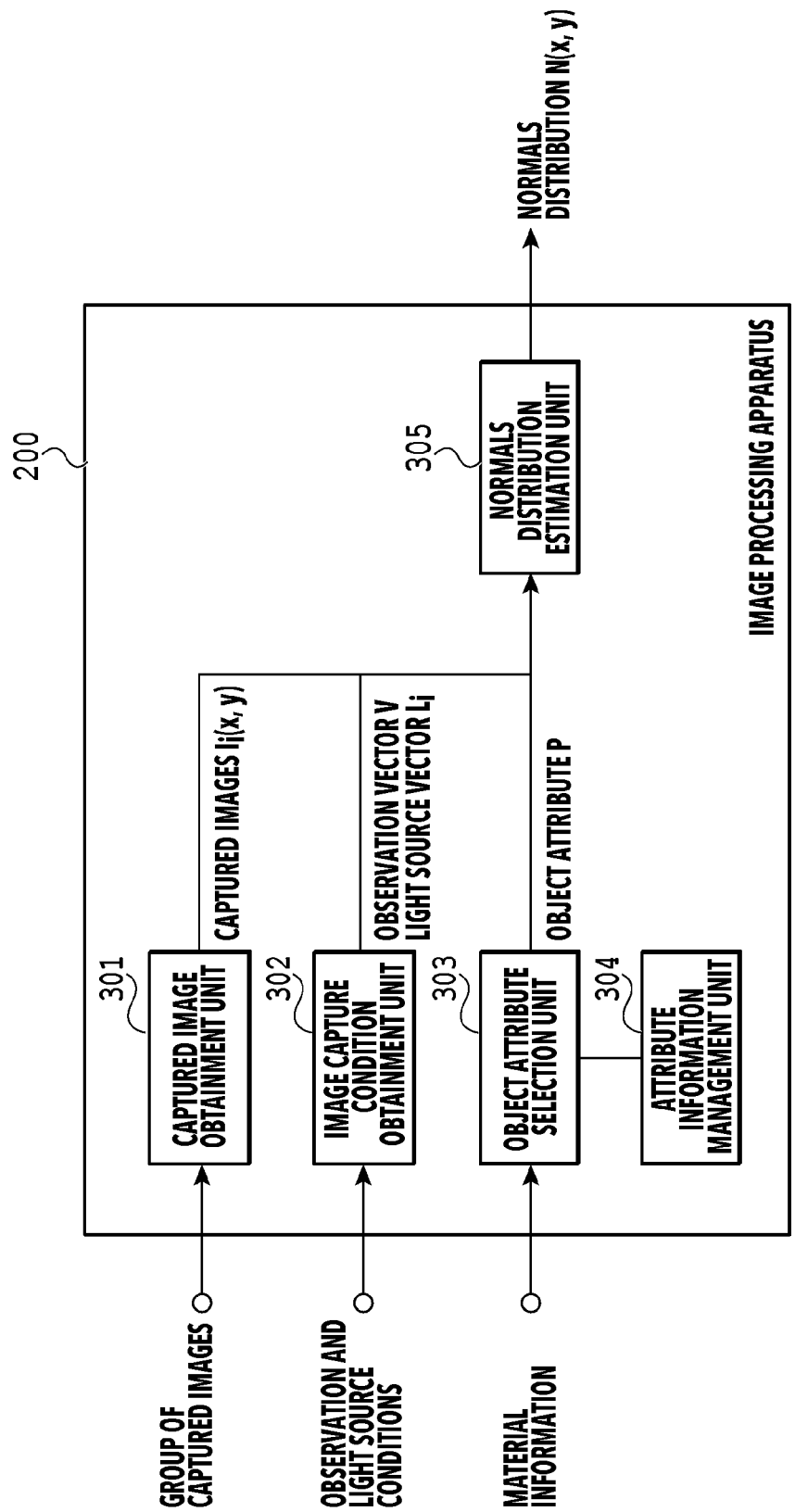
FIG. 3 is a block diagram showing the functional configuration of the image processing apparatus.

FIG. 3 is a block diagram showing the functional configuration of the image processing apparatus 200 of the present embodiment. The image processing apparatus 200 has a captured image obtainment unit 301, an image capture condition obtainment unit 302, an object attribute selection unit 303, an attribute information management unit 304, and a normals distribution estimation unit 305.

The captured image obtainment unit 301 obtains m captured images captured by a camera placed to face in a direction toward a substantially planar object with the light source direction being changed. A captured image is data having observed luminances (luminance values) on the respective pixel positions (x, y). In other words, a captured image is data having the luminance values of positions (x, y) on an object. Although the following description assumes that a captured image obtained is a one-channel data having luminance values, it may be data having three-channel RGB data. In that case, the normals distribution estimation processing to be described later may be performed using, for example, the luminance value of a color with the strongest luminance among RGB.

In the following description, the luminance value of a pixel position (x, y) on an i-th captured image of the m captured images is expressed as a luminance $I_i(x, y)$ (i=1, 2, . . . , m). Thus, the captured image obtainment unit 301 obtains the luminance $I_i(x, y)$ (i=1, 2, . . . , m).

The image capture condition obtainment unit 302 obtains an observation vector $V=(V_x, V_y, V_z)$ and light source vectors $L_i=(L_{ix}, L_{iy}, L_{iz})$ (i=1, 2, . . . , m). The light source vector $L_i$ is a unit vector corresponding to the orientation of the light source set to obtain the luminance $I_i(x, y)$, i.e., capture the i-th captured image. The observation vector V and the light source vectors $L_i$ are described as being a three-row, one-column vector.

The object attribute selection unit 303 selects an object attribute P based on object material information inputted by a user via a UI screen. The object material information is the name of the material of the object, such as leather, paper, or wood.

The attribute information management unit 304 holds and manages, in a storage unit, a plurality of object attributes P corresponding to materials. The object attribute P is a value indicating an attribute indicating reflection properties. Specifically, the object attribute P is a parameter indicating whether the reflection properties of the material exhibit diffuse reflection, exhibit specular reflection, or exhibit properties of both diffuse reflection and specular reflection. Details will be described later.

The normals distribution estimation unit 305 performs processing for estimating a normals distribution based on the luminances $I_i(x, y)$, the observation vector $V=(V_x, V_y, V_z)$, the light source vectors $L, =(L_{ix}, L_{iy}, L_{iz})$, and the object attribute P. A normals distribution is data having normal vectors (also denoted simply as normals) $N(x, y)=(N_x(x, y), N_y(x, y), N_z(x, y))$ indicating the directions of normals to pixel positions (x, y) corresponding to respective positions on an object. The normal vector N(x, v) is a three-row, one-column vector. Note that a normals distribution may also be expressed as N(x, y).

The image processing apparatus 200 implements the functions shown in FIG. 3 by causing the CPU 201 to execute programs stored in the ROM 202 using the RAM 203 as a work memory. Note that the processing described below does not need to be executed entirely by the CPU 201, and the image processing apparatus 200 may be configured so that some or all of the functional units may be performed by one or more processing circuits other than the CPU 201. For example, hardware such as a graphics processing unit (GPU) or a field-programmable gate array (FPGA) for faster computing may be used. In other words, the functional units of the image processing apparatus 200 may be implemented by cooperation between software and hardware such as dedicated ICs, or some or all the functions may be implemented only by hardware.

[Processing Performed by the Image Processing Apparatus]

Figure 4:
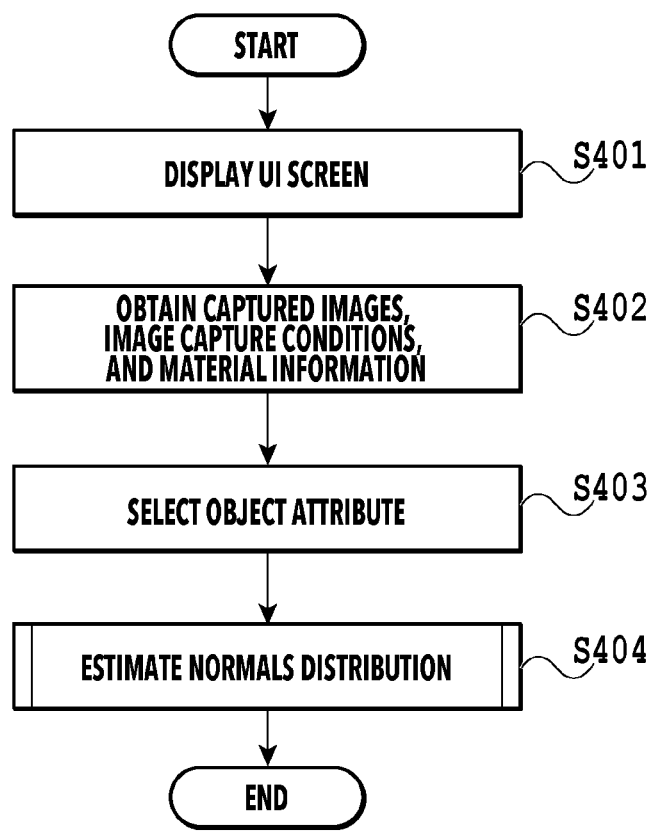
FIG. 4 is a flowchart showing processing executed by the image processing apparatus.

FIG. 4 is a flowchart showing processing executed by the image processing apparatus 200. A series of processing shown in the flowchart in FIG. 4 is executed by the CPU 201 of the image processing apparatus 200 by loading program code stored in the ROM 202 into the RAM 203 and executing the program code. Some or all the functions in the steps in FIG. 4 are implemented by hardware such as an ASIC or an electric circuit. Note that the letter "S" in the description of the processing means that it is a step in the flowchart, and this also applies to the other flowcharts below. The processing in FIG. 4 is started once the image processing apparatus 200 receives an instruction from a user via the input device 23.

In S401, on the display 25, the CPU 201 displays a UI screen 501 to obtain information necessary to execute the normals distribution estimation processing.

Figure 5:
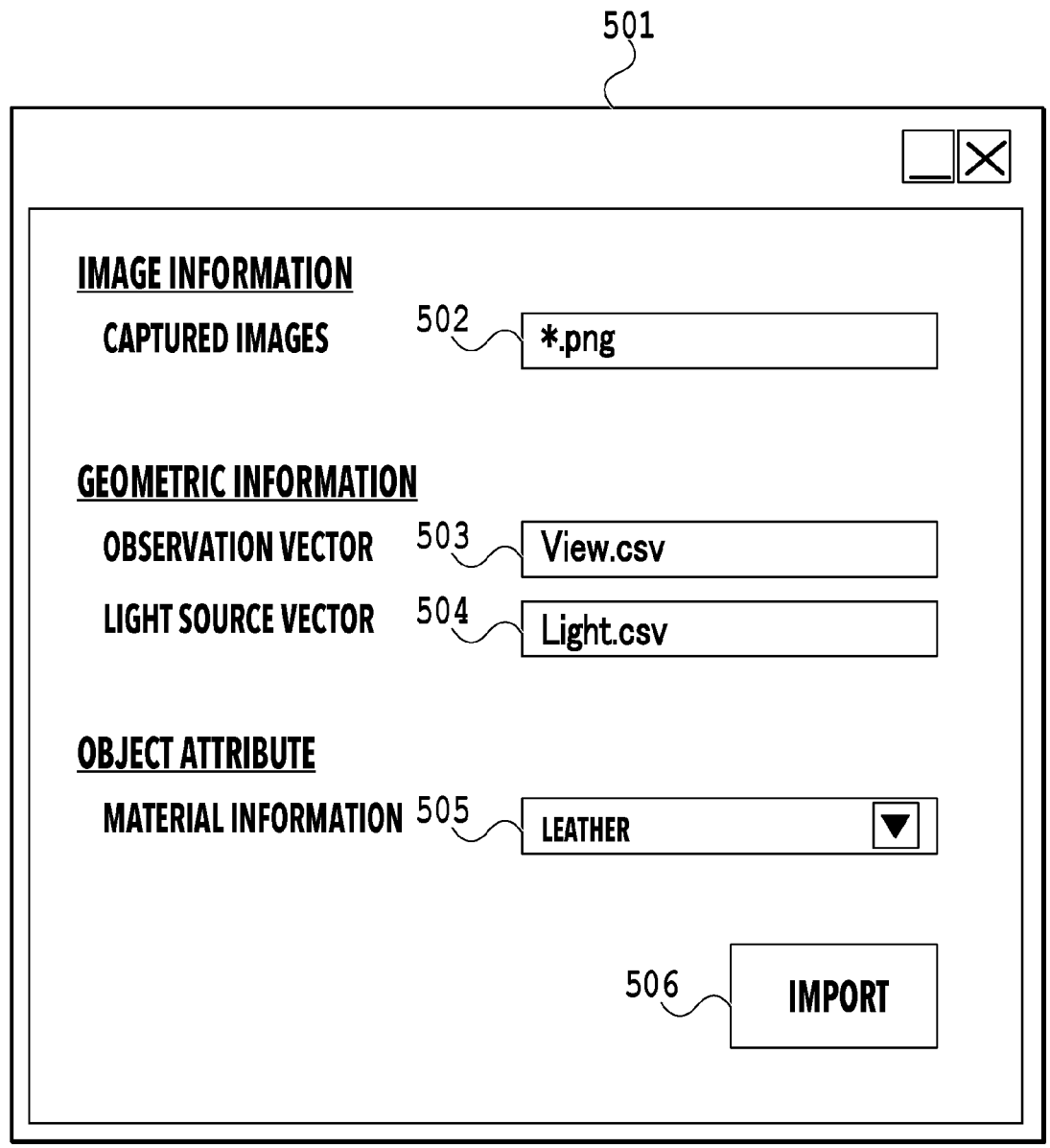
FIG. 5 is a diagram showing an example UI screen.

FIG. 5 is an example of the UI screen 501 displayed in this step. Via the UI screen 501, a user can instruct the data storage locations of captured images including information on the luminances $I_i(x, y)$, the observation vector V, and the light source vectors $L_i$. An area 502 on the UI screen 501 is an area for inputting the storage location of captured images. An area 503 is an area for inputting the storage location of the observation vector. An area 504 is an area for inputting the storage location of the light source vectors.

A pull-down menu 505 is a pull-down menu for selecting information on the material of the object to be subjected to the normals distribution estimation.

In S402, the captured image obtainment unit 301 obtains m captured images from the data storage location designated by the user via the UI screen 501 and obtains information on the luminances $I_i(x, y)$. Similarly, the image capture condition obtainment unit 302 obtains, from the data storage locations designated by the user, information on the observation vector V and the light source vectors $L_i$, as information on image capture conditions used to capture the m captured images. The object attribute selection unit 303 obtains object material information selected by the user via the UI screen 501. In the processing in this step, the pieces of data are obtained from their respective storage locations in response to an IMPORT button 506 on the UI screen 501 being pressed down.

Note that the storage locations of the data obtained in this step are included in the HDD 27 here, but the data obtained in this step may be stored in a different apparatus connected to the image processing apparatus 200. Alternatively, the data obtained in this step may be stored in a storage unit different from the HDD 27 of the image processing apparatus 200.

In S403, the object attribute selection unit 303 selects an object attribute P that corresponds to the object material information obtained in S402 based on a list associating pieces of material information with object attributes, the list being held by the attribute information management unit 304.

FIG. 6 is a diagram showing an example list of object attributes P corresponding to pieces of material information, the list being represented in a table format and managed by the attribute information management unit 304. A list showing combinations of material names and object attributes P as shown in FIG. 6 is stored in a storage unit of the image processing apparatus 200. Based on this list, the object attribute selection unit 303 can select an object attribute P that corresponds to the object material inputted by the user. In other words, the object attribute selection unit 303 can select reflection properties corresponding to the material of the object.

The object attribute P includes any one of numbers 1 to 3. As shown in Formula (3), 1 as the object attribute P indicates that the reflection properties of the material of the object exhibit diffuse reflection, 2 as the object attribute P indicates that the reflection properties of the material of the object exhibit specular reflection, and 3 as the object attribute P indicates that the reflection properties of the material of the object exhibit both diffuse reflection and specular reflection.

$$p = \begin{cases} 1 & \text{(material exhibiting diffuse reflection)} \\ 2 & \text{(material exhibiting specular reflection)} \\ 3 & \text{(material exhibiting both diffuse reflection and specular diffusion)} \end{cases}$$

Formula (3)

In S404, the normals distribution estimation unit 305 executes normals distribution estimation to estimate the normal vector N(x, y) of each pixel position (x, y) based on the luminances $I_i$(x, y), the observation vector V, the light source vectors $L_i$, and the object attribute P. Details of the processing of this step are described below.

[Normals Distribution Estimation Processing]

Figure 7:
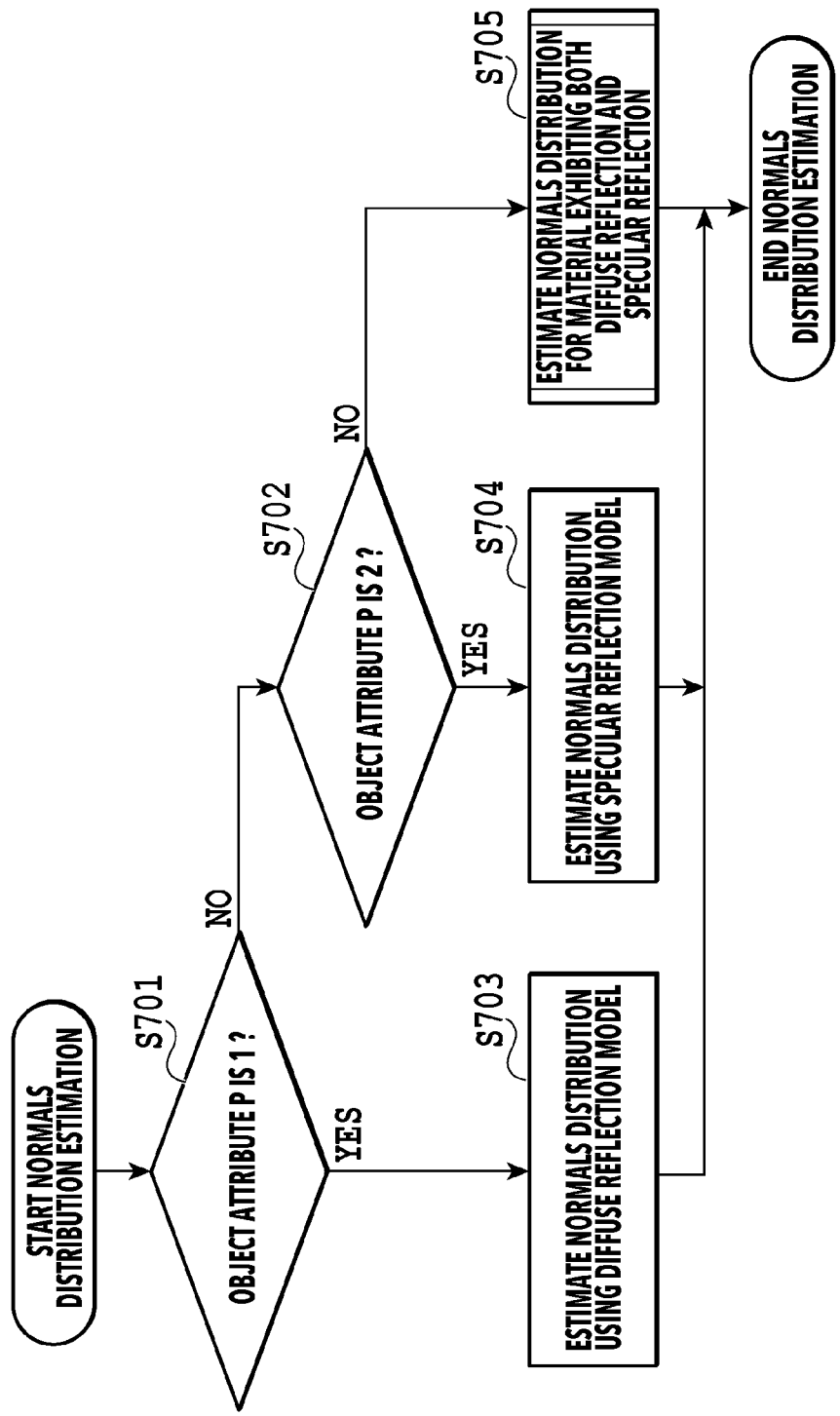
FIG. 7 is a flowchart illustrating details of normals distribution estimation processing.

FIG. 7 is a flowchart illustrating details of the normals distribution estimation processing of the present embodiment. FIG. 7 is used to describe details of the processing in S404.

First, in order to perform normals distribution estimation using a reflection model based on the object attribute P selected in S403, determinations are made in S701 and S702 to switch processing in accordance with the object attribute P selected.

In S701, the normals distribution estimation unit 305 determines whether the object attribute P is 1. If the object attribute P is 1 (YES in S701), the normals distribution estimation unit 305 proceeds to S703 and performs normals distribution estimation using a diffuse reflection model. Details of the normals distribution estimation using a diffuse reflection model will be described later.

Meanwhile, if the object attribute P is not 1 (NO in S701), in S702 the normals distribution estimation unit 305 determines whether the object attribute P is 2. If the object attribute P is 2 (YES in S702), the normals distribution estimation unit 305 proceeds to S704 and performs normals distribution estimation using a specular reflection model. Details of the normals distribution estimation using a specular reflection model will be described later.

If the object attribute P is 3 (NO in S702), the normals distribution estimation unit 305 proceeds to S705 and performs normals distribution estimation using a model for reflection properties exhibiting both diffuse reflection and specular reflection. Details of this step will be described later.

[Normals Distribution Estimation Using a Diffuse Reflection Model]

Next, a description is given of an example of a method for the normals distribution estimation using a diffuse reflection model executed in S703. In present embodiment, normals distribution estimation using a reflection model of Lambertian reflection is described as normals distribution estimation using a diffuse reflection model.

In Formula (1) shown above, the observed luminances I are based on the normal angle $\theta_n$ and the light source angle $\theta_l$. In a case of using the light source vector $L_i$ and the normal vector N(x, y), in the diffuse reflection model, the luminances $I_i$(x, y) can be expressed by Formula (4).

$$I_i(x,y) = ER_d L_i^T N(x,y)$$ Formula (4)

The superscript T is an index representing transposition. According to Formula (4), the luminances $I_1$(x, y) to $I_m$(x, y) corresponding to the 1st to m-th captured images can be expressed by Formula (5).

$$\begin{pmatrix} I_1(x,y) \\ I_2(x,y) \\ \vdots \\ I_m(x,y) \end{pmatrix} = ER_d \begin{pmatrix} L_1^T \\ L_2^T \\ \vdots \\ L_m^T \end{pmatrix} N(x,y)$$ Formula (5)

-continued $$\begin{pmatrix} L_1^T \\ L_2^T \\ \vdots \\ L_m^T \end{pmatrix}$$ Formula (6)

In a case where there is an inverse matrix (or a pseudo inverse matrix if there are more than three rows) of Formula (6), N(x, y) can be found from Formula (7) which is obtained by multiplication of the left-hand side of Formula (5) by the inverse matrix of Formula (6).

$$\begin{pmatrix} L_1^T \\ L_2^T \\ \vdots \\ L_m^T \end{pmatrix}^{-1} \begin{pmatrix} I_1(x,y) \\ I_2(x,y) \\ \vdots \\ I_m(x,y) \end{pmatrix} = ER_d N(x,y)$$ Formula (7)

The normal vector N(x, y) of a pixel position (x, y) on the right-hand side of Formula (7) is a vector normalized by Formula (8).

$$|N(x,y)|=1$$ Formula (8)

Using the method thus described, the normals distribution can be estimated using a diffuse reflection model where the luminance I is the highest in a case where the light source vector $L_i$ and the normal vector N at a pixel position (x, y) equal.

Although formulae based on Lambertian reflection are used as diffuse reflection model formulae above, formulae based on a different reflection model, such as the Oren-Nayar model, may be used instead. In that case, as in the normals distribution estimation for specular reflection to be described below, estimation processing may be performed using objective function minimization.

[Normals Distribution Estimation Using a Specular Reflection Model]

Next, a description is given of an example of a method for normals distribution estimation using a specular reflection model executed in S704. In the present embodiment, normals distribution estimation using the Blinn-Phong model is described as normals distribution estimation using a specular reflection model.

In Formula (2) shown above, the observed luminances I are based on the normal angle $\theta_n$ and the light source angle $\theta_l$. In a case of using the light source vector $L_i$ and the normal vector N(x, y), in the specular reflection model, the luminance $I_i$(x, y) can be expressed by Formula (9).

$$I_i(x,y) = ER_s(H_i^T N(x,y))^\alpha$$ Formula (9)

In Formula (9), $H_i$ is a halfway vector between the observation vector V and the light source vector $L_i$, as shown in Formula (10).

$$H_i = \frac{V + L_i}{|V + L_i|}$$ Formula (10)

The normals distribution estimation in this case is performed by optimization to minimize the difference between the left-hand side and the right-hand side of Formula (9). Specifically, Formula (11) is used to find the normal vector N(x, y) at the pixel position (x, y). In Formula (11), argmin is a function that returns an estimated value for function minimization.

$$\hat{N}(x, y), \hat{E}, \hat{R}_s,$$

$$\hat{\alpha} = \underset{N(x,y),E,R_S,\alpha}{\operatorname{argmin}} \sum_i \left(I_i(x, y) - ER_s\left(H_i^T N(x, y)\right)^\alpha\right)^2$$ Formula (11)

Using the method thus described, the normals distribution can be estimated using a specular reflection model where the luminance I is the highest in a case where the halfway vector H and the normal vector N at the pixel position (x, y) equal.

Although formulae based on the Blinn-Phong model are used as formulae for a reflection model of specular reflection in the method described above, formulae based on a different model, such as the Torrance-Sparrow model or approximation using a Gaussian function, may be used instead.

[Normals Distribution Estimation for Reflection Properties Having Both Diffuse Reflection and Specular Reflection]

Figure 8:
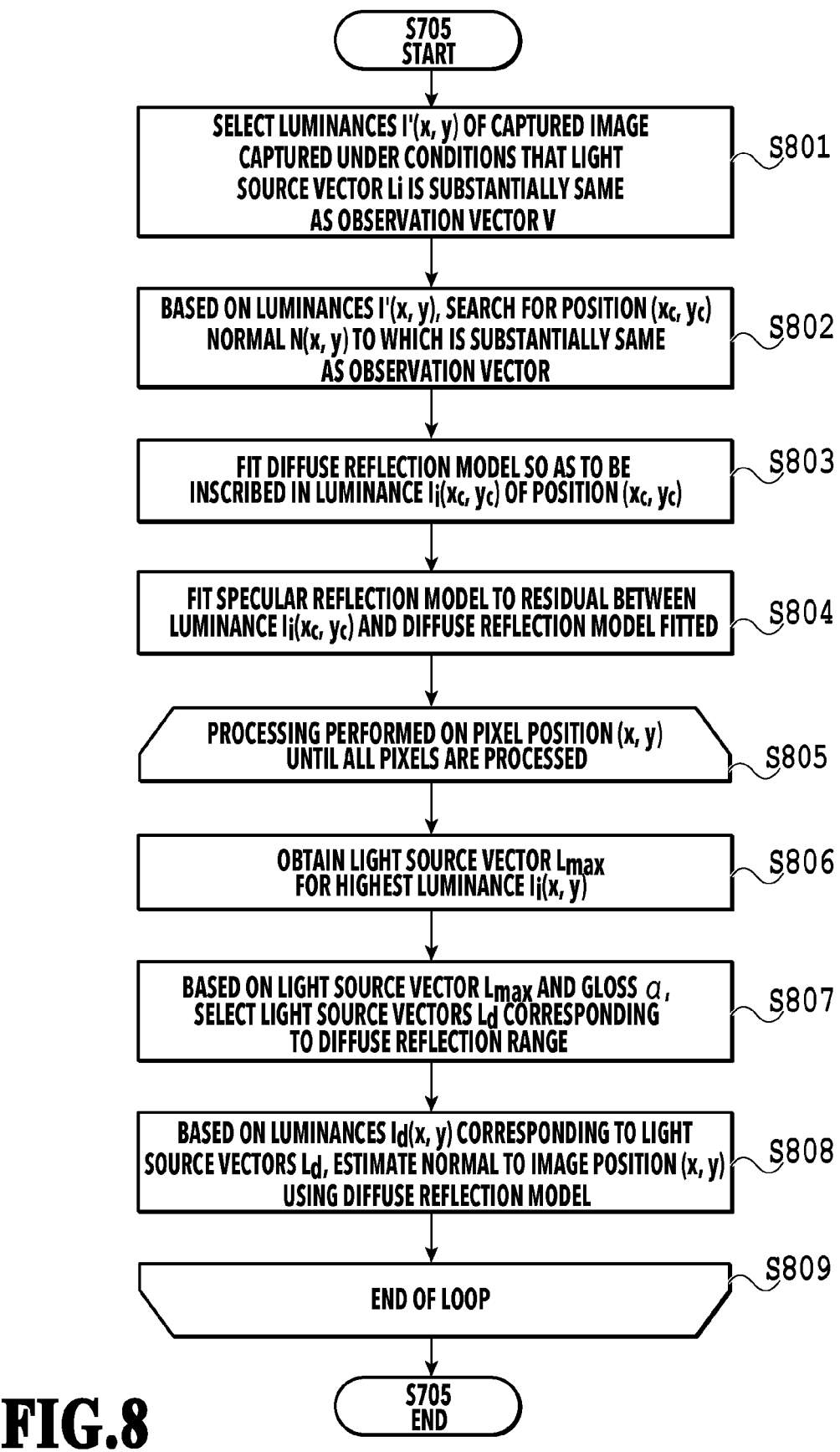
FIG. 8 is a flowchart of normals distribution estimation for a material exhibiting both diffuse reflection and specular reflection.

FIG. 8 is a flowchart showing details of processing for normals distribution estimation using a model for reflection properties having both diffuse reflection and specular reflection. FIG. 8 is used to describe details of processing in S705.

In the present embodiment, a method for performing normals distribution estimation by first separating specular reflection and diffuse reflection and then using either a diffuse reflection model or a specular reflection model is described as a method for normals distribution estimation using a model for reflection properties having both diffuse reflection and specular reflection. A method used for separating specular reflection and diffuse reflection is determining a criteria for the separation based on the luminance of a position where the normal vector N is substantially the same as the observation vector V is used.

In S801, the normals distribution estimation unit 305 selects, from them captured images, an image captured under the image capture conditions that the orientation of the light source vector L; is closest to the orientation of the observation vector V. First, the normals distribution estimation unit 305 selects a light source vector $L_{i'}$ such that the angle formed between the light source vector L and the observation vector V is the smallest. Formula (12) is used to find "i'" in the light source vector $L_{i'}$ selected. In Formula (12), argmax is a function that returns an estimated value for function maximization. As a result, in this step, the i'-th captured image is obtained.

$$i' = \underset{i}{\operatorname{argmax}}\left(V^T L_i\right)^2$$ Formula (12)

Figure 9D:
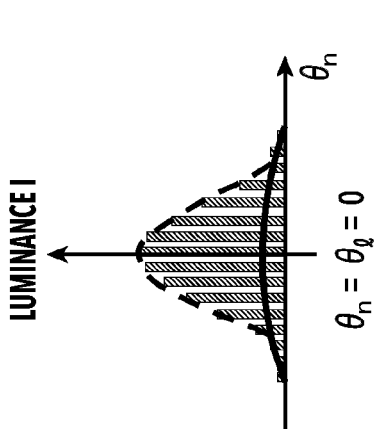
FIGS. 9A to 9D are diagrams showing an example of image capture conditions and changes in luminance in a case where the observation vector and the light source vector are substantially the same.
Figure 9C:
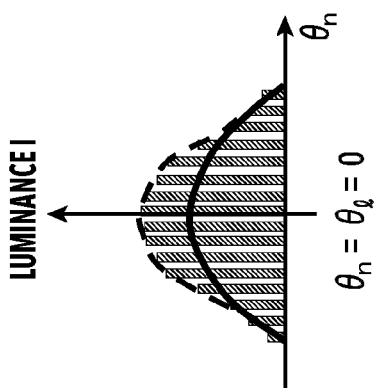
Figure 9B:
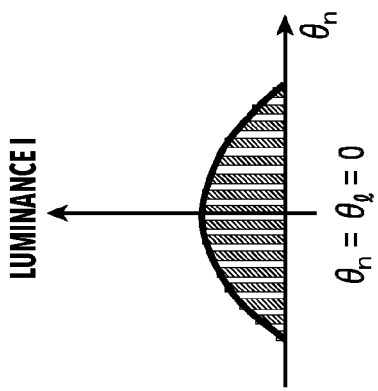
Figure 9A:
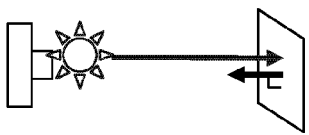

FIGS. 9A to 9D are diagrams illustrating image capture conditions for obtaining the i'-th captured image and the relation between luminance and the normal angle $\theta_n$ in the i'-th capturing image. In the present embodiment, as described earlier, a camera is placed to face in a direction toward a substantially planar object, and a captured image captured under the geometric conditions that the light source is also placed to face in a direction toward the object as shown in FIG. 9A is obtained in this step.

The luminances included in the i'-th captured image are expressed by luminances I'(x, y). Formula (13) is used to select the luminance I'(x, y).

$$I'(x,y)=I_{i'}(x,y)$$ Formula (13)

In S802, the normals distribution estimation unit 305 searches for a pixel position $(x_c, y_c)$ whose normal vector $N(x_c, y_c)$ is substantially the same as the observation vector V among the normal vectors N(x, y) at the respective positions. In the present embodiment described herein, a normal vector $N(x_c, y_c)$ substantially the same as the observation vector V is a vector whose orientation is the closest to the orientation of the observation vector V among the normal vectors N(x, y) at the respective positions.

The i'-th light source vector $L_4$ selected by the processing in the previous step S801 is substantially the same as the observation vector V. Thus, the halfway vector $H_{i'}$ between the observation vector V and the light source vector L, is similarly substantially the same as the light source vector $L_{i'}$. Thus, the specular reflection corresponding to the luminance I'(x, y) can be expressed by the following Formula (14) by replacing the halfway vector $H_i$ in Formula (9) with the light source vector $L_{i'}$.

$$I'(x,y)=ER_s(L_{i'}^T N(x,y))^\alpha$$ Formula(14)

As shown in Formula (14), under the image capture condition of the light source vector $L_{i'}$, the luminance is the highest in a case where the light source vector $L_{i'}$ and the normal vector N at the pixel position (x, y) equal, as in the Lambertian reflection model of diffuse reflection.

FIGS. 9B, 9C, and 9D are graphs indicating changes in the luminance I' relative to changes in the normal angle $\theta_n$ under the geometric conditions of the i'-th captured image shown in FIG. 9A. FIG. 9B shows a graph for a case where the reflection properties of the material of the object exhibit mainly diffuse reflection, FIG. 9C shows a graph for a case where the reflection properties of the material of the object exhibit both diffuse reflection and specular reflection, and FIG. 9D shows a graph for a case where the reflection properties of the material of the object exhibit mainly specular reflection. In any of these cases, the luminance I' is the highest at the point where the normal angle $\theta_n$ and the light source angle $\theta_l$ equal. In this way, under the image capture condition of the light source vector $L_{i'}$, the normal vector $N(x_c, y_c)$ at the pixel position $(x_c, y_c)$ having the highest luminance is substantially the same as the light source vector $L_{i'}$. Also, since the observation vector V is similarly substantially the same as the light source vector $L_{i'}$, the normal vector $N(x_c, y_c)$ is also substantially the same as the observation vector V.

Thus, the position $(x_c, y_c)$ having the normal vector $N(x_c, y_c)$ which is substantially the same as the observation vector V is found by calculating the pixel position $(x_c, y_c)$ with the highest luminance using Formula (15). A pixel at the pixel position $(x_c, y_c)$ may be called a pixel of interest.

$$x_c, y_c = \underset{x,y}{\operatorname{argmax}} I'(x, y)$$ Formula (15)

In S803, the normals distribution estimation unit 305 fits the diffuse reflection model so as to be inscribed in the luminance $I_i(x_c, y_c)$ at the pixel position $(x_c, y_c)$. A specific method is as follows.

The normal vector $N(x_c, y_c)$ at the pixel position $(x_c, y_c)$ obtained in the previous step S802 is substantially the same as the light source vector $L_{i'}$ and the observation vector V, and these vectors face in a direction toward the object. Utilizing this state, this step and the next step estimate a parameter with the normal vector N fixed at the observation vector V.

Based on the Lambertian reflection formula in Formula (4), a diffuse reflection model for the pixel position $(x_c, y_c)$ can be expressed by the following Formula (16), where D is the product of a light source intensity E and a diffuse reflectance $R_d$ as shown in Formula (17).

$$I_i(x_c, y_c) = DL_i^T V \qquad \text{Formula (16)}$$

$$D = ER_d \qquad \text{Formula (17)}$$

Then, a parameter D with which the model is inscribed in the luminance $I_i(x_c, y_c)$ is found by a search of D that satisfies Formula (18) while increasing D from 0.

$$\min_i |I_i(x_c, y_c) - DL_i^T V| < T_d \qquad \text{Formula (18)}$$

In Formula (18), $T_d$ is a threshold for evaluation of error between the luminance and the model. In the search, D is incremented by, for example, 0.05, and the threshold Td is, for example, Td=1. These numeric values are examples, and different values may be set, or a user may input the increment of D and the threshold Td via a UI screen or the like.

In S804, the normals distribution estimation unit 305 fits a specular reflection model to the residual between the luminance $I_i(x_c, y_c)$ and the diffuse reflection model fitted in S803. A specific method is as follows.

Specifically, as shown in Formula (19), a specular reflection model formula for the pixel position $(x_c, y_c)$ is fitted to the residual between the luminance $I_i(x_c, y_c)$ and the diffuse reflection model fitted in S803. The specular reflection model formula for the pixel position $(x_c, y_c)$ is a formula such that the normal vector N in Formula (9) is fixed at the observation vector V.

Note that as shown in Formula (20), S denotes the product of the light source intensity E and a specular reflectance $R_s$. Formula (19) is used to find a parameter $S = ER_s$ and a gloss $\alpha$ for specular reflection for the object.

$$\hat{S}, \hat{\alpha} = \underset{S,\alpha}{\operatorname{argmin}} \sum_k (I_i(x_c, y_c) - DL_i^T V - S(H_i^T V)^\alpha)^2 \qquad \text{Formula (19)}$$

$$S = ER_s \qquad \text{Formula (20)}$$

The following steps S805 to S809 are loop processing, and in S805, a processing target pixel position (x, y) is selected from pixel positions on the captured images. Then, processing of S806 to S808 is performed on the processing target pixel position (x, y). If there is an unprocessed pixel position in S809, processing proceeds back to S805 to select the next unprocessed pixel position, thus repeating the processing.

In S805, the normals distribution estimation unit 305 selects a processing target pixel position (x, y).

In the following description of S806 to S808, the processing target pixel position is denoted as (x, y).

In S806, the normals distribution estimation unit 305 obtains a light source vector $L_{max}$ as an image capture condition under which the luminance of the processing target pixel position (x, y) is the highest among the luminances $I_i(x, y)$ in the respective m captured images. Specifically, an index $i_{max}$ of the captured image including the highest luminance value is searched for based on Formula (21), and the corresponding light source vector $L_{imax}$ is set to $L_{max}$ using Formula (22).

$$i_{max} = \underset{i}{\operatorname{argmin}} I_i(x, y) \qquad \text{Formula (21)}$$

$$L_{max} = L_{i_{max}} \qquad \text{Formula (22)}$$

In S807, based on the light source vector $L_{max}$ and the gloss $\alpha$, the normals distribution estimation unit 305 selects a light source vector $L_d$ corresponding to diffuse reflection.

Figure 10:
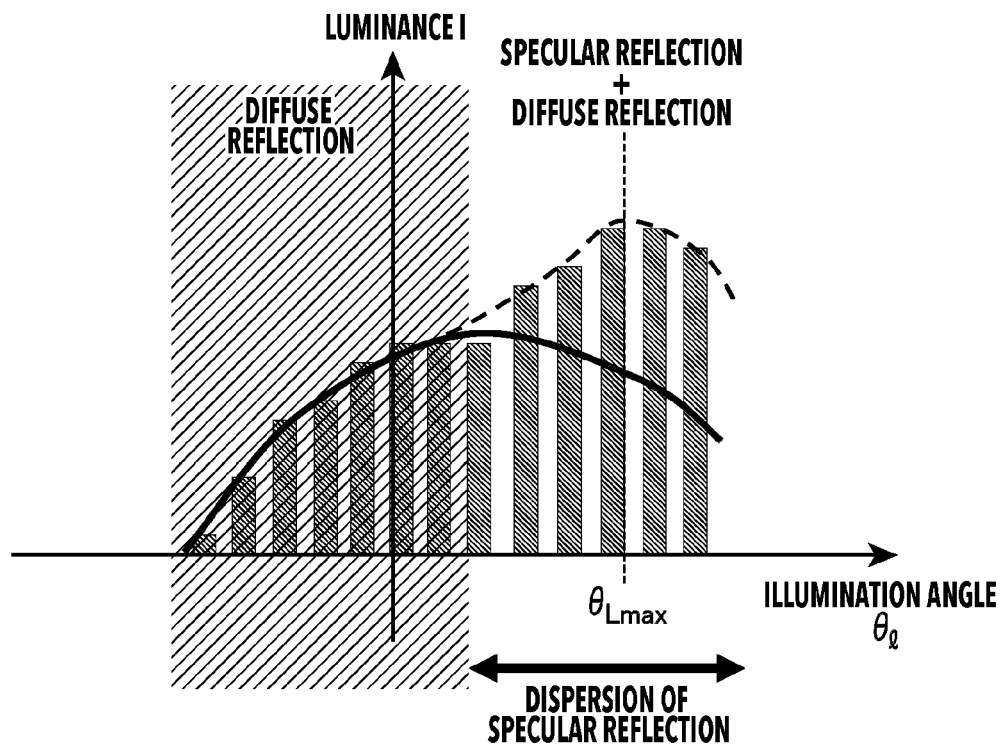
FIG. 10 is a diagram showing an example of how luminance changes for a material exhibiting both diffuse reflection and specular reflection.

FIG. 10 is a diagram showing the relation between an illumination angle $\theta_I$ and the luminance I at a processing target pixel position in a case where the reflection properties have both diffuse reflection and specular reflection. The illumination angle $\theta_I$ at which the luminance I is the highest is $\theta_{Lmax}$. In other words, $\theta_{Lmax}$ is the illumination angle $\theta_I$ of the light source having the light source vector $L_{max}$ as an image capture condition. The dispersion of reflection which is a range from the illumination angle at which the luminance is the highest to the illumination angle at which the luminance is regarded as being the smallest is narrower in specular reflection than in diffuse reflection. Thus, outside the dispersion of specular reflection having the illumination angle $\theta_{Lmax}$ as its center, there is a region which can be regarded as diffuse reflection influenced little by specular reflection, as indicated in the region hatched with lines in FIG. 10. Thus, in this step, a normal vector of the processing target pixel position is estimated by regarding the region outside the dispersion of specular reflection as diffuse reflection.

In S804 described earlier, the parameter a is estimated based on the Blinn-Phong model. The Blinn-Phong model is modeled so that reflection spreads from the peak of specular reflection by the power of the inner product of the halfway vector and the normal vector, as shown in Formula (9). Based on Formula (9), the luminance is the highest in a case where the normal vector N and the halfway vector H equal, and thus, the halfway vector $H_{max}$ between the light source vector $L_{max}$ and the observation vector V is regarded as a normal. Then, Formula (23) expresses the spread of specular reflection with reference to $H_{max}$ and the halfway vector $H_i$.

$$I = (H_{max}^T H_i)^\alpha \qquad \text{Formula (23)}$$

Figure 16:
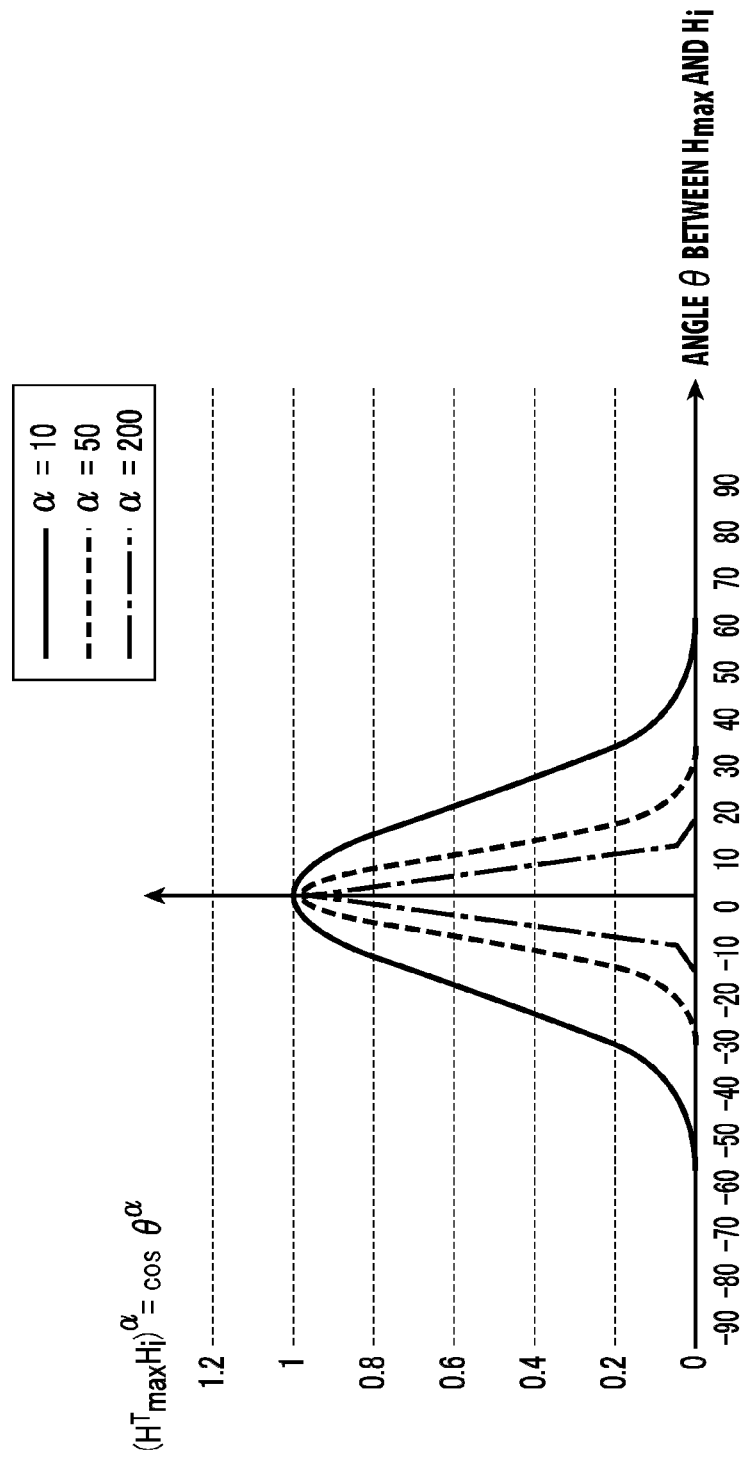
FIG. 16 is a diagram illustrating dispersion of specular reflection.

FIG. 16 is a diagram showing a luminance distribution based on the model of Formula (23). The upper-limit value of the luminance of specular reflection that can be regarded as having little luminance of specular reflection as shown in the hatched region in FIG. 10 is denoted as a threshold $I_t$. In this case, by finding the light source vector $L_i$ that satisfies Formula (24) below and setting this light source vector as the light source vector $L_d$, the light source vector $L_d$ corresponding to the region regarded as diffuse reflection in FIG. 10 can be found. Note that in Formula (24), the halfway vector $H_i$ is expressed by the observation vector V and the light source vector $L_i$ based on Formula (10).

$$I_t > \left(H_{max}^T \frac{V + L_i}{|V + L_i|}\right)^\alpha \qquad \text{Formula (24)}$$

Specifically, an index d in the light source vector $L_d$ in the region that satisfies Formula (25) below, is outside the range of specular reflection, and can be regarded as diffuse reflection is selected based on Formula (26). Formula (25) is a formula in which the power in Formula (24) is moved to the left-hand side.

$$I_t^{\frac{1}{a}} > H_{max}^T \frac{V+L_i}{|V+L_i|} \qquad \text{Formula (25)}$$

$$d = \left\{ i \,\middle|\, H_{max}^T \frac{V+L_i}{|V+L_i|} < I_t^{\frac{1}{a}}, i = 1, 2, \ldots, m \right\} \qquad \text{Formula (26)}$$

The threshold $I_t$ is, for example, set to $I_t=0.05$ in a case where the threshold is set to be 5% of the maximum luminance of specular reflection. This value is an example, and a different value may be set instead.

In S808, the normals distribution estimation unit 305 estimates the normal vector $N(x, y)$ of the processing target position $(x, y)$ using a diffuse reflection model based on the luminances $I_d(x, y)$ corresponding to the light source vectors $L_d$. Specifically, the normal vector $N(x, y)$ of the processing target position $(x, y)$ is estimated based on the light source vectors $L_d$ and the luminances $I_d(x, y)$ of the corresponding captured images using the normals distribution estimation method by Lambertian reflection in Formula (5).

For example, a case is assumed here where there have been found seven light source vectors $L_d$ that satisfy Formula (26), with these light source vectors being denoted as $L_{d1}$ to $L_{d7}$. Also, luminances in the captured images captured with the light source vectors $L_{d1}$ to $L_{d7}$ are denoted as luminances $I_{d1}$ to $I_{d7}$. In this case, the normal vector $N(x, y)$ of the processing target position $(x, y)$ is estimated based on Formula (27).

$$\begin{pmatrix} I_{d1}(x,y) \\ I_{d2}(x,y) \\ \vdots \\ I_{d7}(x,y) \end{pmatrix} = ERd \begin{pmatrix} L_{d1}^T \\ L_{d2}^T \\ \vdots \\ L_{d7}^T \end{pmatrix} N(x,y) \qquad \text{Formula (27)}$$

In the method thus described, as a model to use for reflection properties having both diffuse reflection and specular reflection, a diffuse reflection model is used to estimate a normals distribution based on the luminances (captured images) of the processing target pixel that can be regarded as diffuse reflection. Alternatively, as a model for reflection properties having both diffuse reflection and specular reflection, the estimation may also be performed using captured images in a range including specular reflection. In that case, for example, as described earlier, a parameter related to diffuse reflection is estimated based on captured images, and luminances based on diffuse reflection are found. Then, luminances that can be regarded as being based on specular reflection are found by subtracting the luminances based on diffuse reflection from the luminances of captured images having both diffuse reflection and specular reflection. Then, using a specular reflection model, a normals distribution is estimated based on the luminances that can be regarded as being based on specular reflection.

In this way, in the present embodiment, either a diffuse reflection model or a specular reflection model is used for estimating the normals distribution as a model for reflection properties having both diffuse reflection and specular reflection. This can reduce the parameters to estimate compared to a normals distribution estimation method using a reflection model that can support various kinds of objects.

Alternatively, the normals distribution estimation may be performed directly using a reflection model formed by the sum of a diffuse reflection model and a specular reflection model as a model for reflection properties having both diffuse reflection and specular reflection.

According to the present embodiment thus described, a normals distribution estimation method can be selected based on the material of the object designated by a user. Thus, highly-accurate normals distribution estimation can be performed in accordance with the reflection properties that the material of the object has.

[Modifications]

The above description assumes that the object information inputted by a user is information on the material (the name of the material). Alternatively, a user may directly input an object attribute P itself.

Also, although the above description assumes that a user inputs material information, alternatively, the image processing apparatus 200 may automatically select the material of the object using a method such as image recognition.

Second Embodiment

In the method described in the first embodiment, the normals distribution estimation method is selected based on the object attribute in accordance with the material information designated by a user. In a method described in the present embodiment, an attribute corresponding to the material of the object is estimated by selecting a pixel of interest and analyzing the ratio of reflection light at the pixel position of the pixel of interest. In the present embodiment, differences from the first embodiment are mainly described. Configurations and processing are the same as those in the first embodiment unless otherwise noted.

[Functional Configuration of the Image Processing Apparatus]

Figure 11:
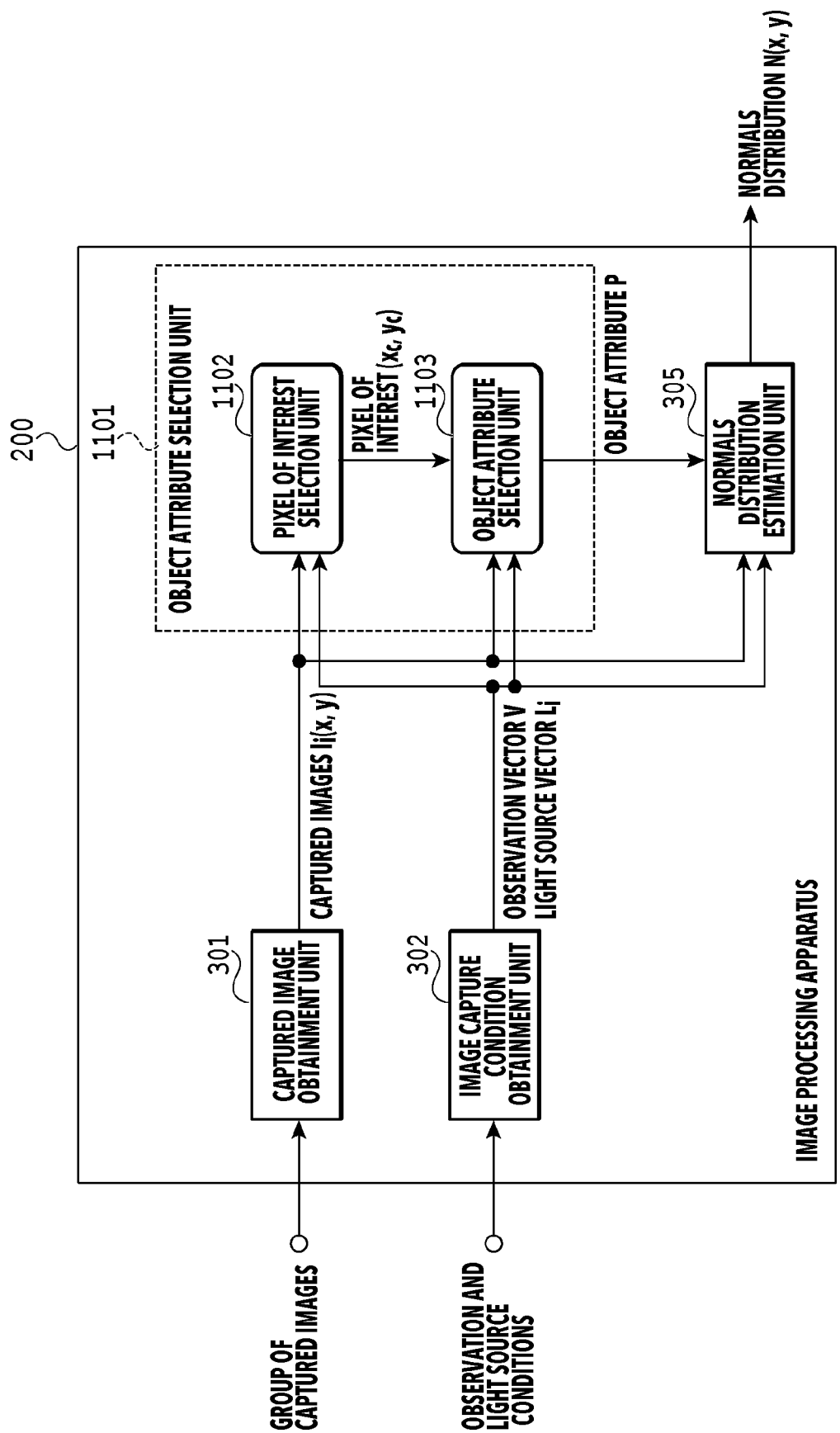
FIG. 11 is a block diagram showing the functional configuration of an image processing apparatus.

FIG. 11 is a block diagram illustrating the functional configuration of the image processing apparatus 200 of the present embodiment. Functional blocks that are the same as those in the image processing apparatus of the first embodiment are denoted by the same numbers as those used in the first embodiment to omit descriptions. The image processing apparatus 200 of the present embodiment has the captured image obtainment unit 301, the image capture condition obtainment unit 302, an object attribute selection unit 1101, and the normals distribution estimation unit 305.

The object attribute selection unit 1101 has a pixel of interest selection unit 1102 and an object attribute selection unit 1103. The pixel of interest selection unit 1102 selects a pixel of interest $(x_c, y_c)$ based on the luminances $I_i(x, y)$, the observation vector V, and the light source vectors $L_i$. The object attribute selection unit 1103 selects an object attribute P based on the luminances $I_i(x, y)$, the observation vector V, the light source vectors $L_i$, and the pixel of interest $(x_c, y_c)$.

[Processing Performed by the Image Processing Apparatus]

Figure 12:
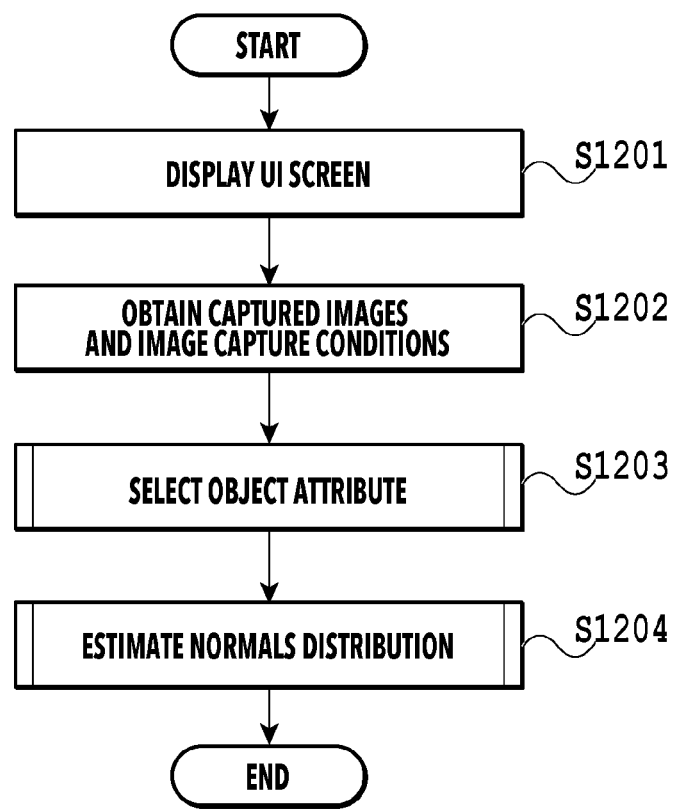
FIG. 12 is a flowchart showing processing executed by the image processing apparatus.

FIG. 12 is a flowchart of the normals distribution estimation processing of the present embodiment executed by the image processing apparatus 200 of the present embodiment.

In S1201, the CPU 201 displays the UI screen 501 on the display 25 to obtain information necessary to execute the normals distribution estimation processing. Since the present embodiment does not use user-designated material information, the UI screen 501 may be without the pull-down menu 505.

In S1202, the captured image obtainment unit 301 obtains m captured images from the data storage location designated by a user via the UI screen 501 and obtains information on the luminances $I_i(x, y)$. Similarly, the image capture condition obtainment unit 302 obtains, from the data storage locations designated by the user, information on the observation vector V and the light source vectors $L_i$, as information on image capture conditions used to capture the m captured images.

In S1203, the object attribute selection unit 1101 selects an object attribute P based on the luminances $I_i(x, y)$, the observation vector V, the light source vectors $L_i$, and the pixel of interest $(x_c, y_c)$. Details of the processing of this step will be described below. The following step S1204 is the same as S404 in the first embodiment and is therefore not described here.

[Object Attribute Selection Processing]

Figure 13:
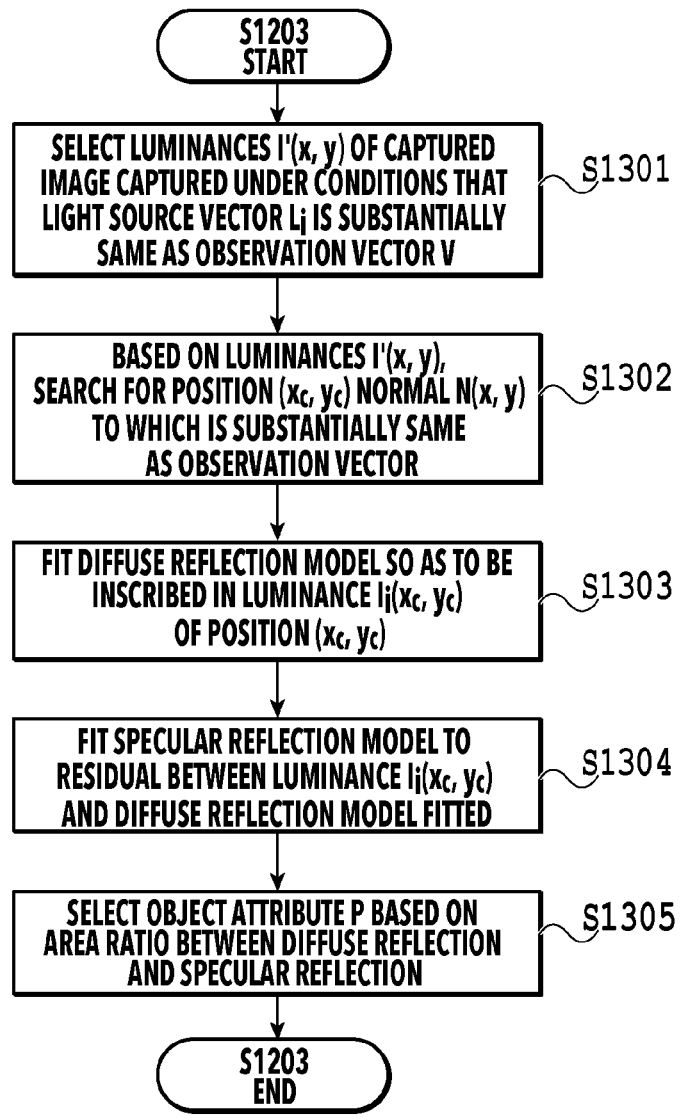
FIG. 13 is a flowchart illustrating details of object attribute selection processing.

FIG. 13 is a flowchart showing details of object attribute selection processing of the present embodiment. FIG. 13 is used to describe details of the processing of S1203.

In S1301, the pixel of interest selection unit 1102 selects a captured image captured under the image capture conditions that the light source vector $L_i$ is substantially the same as the observation vector V and obtains luminances $I'(x, y)$. Specific processing is the same as that performed in S801 in the first embodiment and is therefore not described here.

In S1302, based on the luminances $I'(x, y)$, the pixel of interest selection unit 1102 searches for a pixel position $(x_c, y_c)$ whose normal vector N is substantially the same as the observation vector V. Specific processing is the same as that performed in S802 in the first embodiment and is therefore not described here.

Note that alternatively, the pixel of interest $(x_c, y_c)$ may be selected and determined based on images captured by a camera that has a light emitting unit that emits a light source, such as an electronic flash, and that is capable of capturing images with the light source and the camera being oriented in the same direction. For example, the pixel of interest $(x_c, y_c)$ may be selected using, as the luminances I', the luminances of a captured image obtained by capturing the object with such a camera. This method using a camera with a light emitting unit such as an electronic flash may also be used in the first embodiment for the processing for selecting a pixel of interest.

In S1303, the object attribute selection unit 1103 fits the diffuse reflection model so as to be inscribed in the luminance $I_i(x_c, y_c)$ at the pixel position $(x_c, y_c)$. Specific processing is the same as that performed in S803 in the first embodiment and is therefore not described here.

In S1304, the object attribute selection unit 1103 fits the specular reflection model to the residual between the luminance $I_i(x_c, y_c)$ and the diffuse reflection model fitted in S1303. Specific processing is the same as that performed in S804 in the first embodiment and is therefore not described here.

In S1305, the object attribute selection unit 1103 selects an object attribute P based on an area ratio between an area representing the total of the values obtained from the diffuse reflection model and an area representing the total of the values obtained from the specular reflection model. Specifically, an area $A_d$ for the diffuse reflection model is calculated by Formula (28), and an area $A_s$ for specular reflection is calculated by Formula (29).

$$A_d = \int_{\Omega_L} DL^T dL \quad \text{Formula (28)}$$

$$A_s = \int_{\Omega_L} S(H^T V)^\alpha dL \quad \text{Formula (29)}$$

In Formula (28) and Formula (29), $\Omega_L$ is an integration range of the light source vector and represents a semispherical range on a substantially planar surface of the object. In Formula (28) and Formula (29), the parameters D, S, and α are values obtained based on the luminance $I_i(x_c, y_c)$ at the pixel position $(x_c, y_c)$ of the pixel of interest in S1303 to S1304. Thus, the area of the diffuse reflection model and the area of the specular reflection model at the pixel of interest are found by Formula (28) and Formula (29).

Figure 17A:
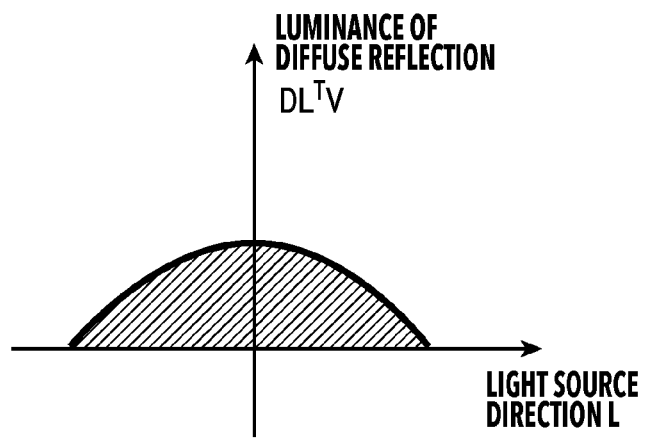
FIGS. 17A and 17B are diagrams illustrating the area of diffuse reflection and the area of specular reflection.
Figure 17B:
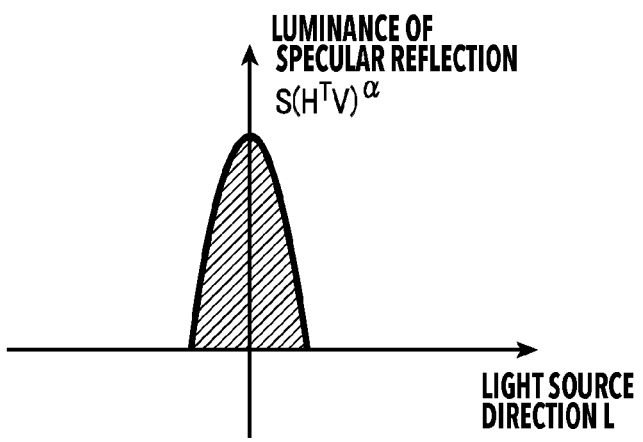

FIGS. 17A and 17B are diagrams illustrating the areas found by Formula (28) and Formula (29). As shown in FIG. 17A, what is found from Formula (28) is the area of a luminance distribution (the area of the hatched part) based on the diffuse reflection model relative to changes in the light source direction (the light source vector L). Also, as shown in FIG. 17B, what is found from Formula (29) is the area of a luminance distribution (the area of the hatched part) based on the specular model relative to changes in the light source direction (the light source vector L).

Next, the object attribute selection unit 1103 selects an object attribute P indicating whether the object is made of a material that exhibits diffuse reflection, a material that exhibits specular reflection, or a material that exhibits both diffuse reflection and specular reflection. As in the first embodiment, the object attribute P is represented by one of the numbers 1 to 3 as shown in Formula (3).

In the present embodiment, the object attribute P is selected based on the area ratio between the area $A_d$ of diffuse reflection and the area $A_s$ of specular reflection. Specifically, the object attribute P is selected based on Formula (30).

$$P = \begin{cases} 1 & \left(\dfrac{A_d}{A_s} < T_{As}\right) \\ 2 & \left(\dfrac{A_d}{A_s} < T_{As}\right) \\ 3 & \text{(Neither of the above)} \end{cases} \quad \text{Formula (30)}$$

In Formula (30), $T_A a$ is a threshold for determining the ratio of the area of specular reflection to the area of diffuse reflection, and $T_{As}$ is a threshold for determining the ratio of the area of diffuse reflection to the area of specular reflection. In the present embodiment, in a case where one of the area of diffuse reflection and the area of specular reflection is larger than the other by ten times or more, reflection of the one type is regarded as dominant. Thus, the threshold $T_{Ad}$ and the threshold $T_{As}$ are both set to 0.1. The value of the threshold $T_{Ad}$ and the threshold TA, is an example. A different value may be set, or a user may set the threshold $T_{Ad}$ and the threshold $T_{As}$ via an UI screen or the like.

For example, in a case where the object is made of a material that exhibits diffuse reflection, the residual $I_i(x_c, y_c)$–$DL^T$ V in Formula (19) is 0, so that the parameter S is determined to be 0 as a result of the processing of S1304. Thus, the value of As is 0 according to Formula (29), and the object attribute selection unit 1103 can determine, using Formula (30), that the object attribute is P=1.

The present embodiment thus described can select an object attribute corresponding to the material of the object. This can help save a user the work of inputting material information.

Third Embodiment

In a method described in the present embodiment, after normals distribution estimation is performed using a reflection model based on an object attribute, the normals distribution is updated based on the formation of the normals distribution in order to increase the accuracy of normals distribution estimation. In the present embodiment, differences from the first embodiment are mainly described.

Configurations and processing are the same as those in the first embodiment unless otherwise noted.

[Functional Configuration of the Image Processing Apparatus]

Figure 14:
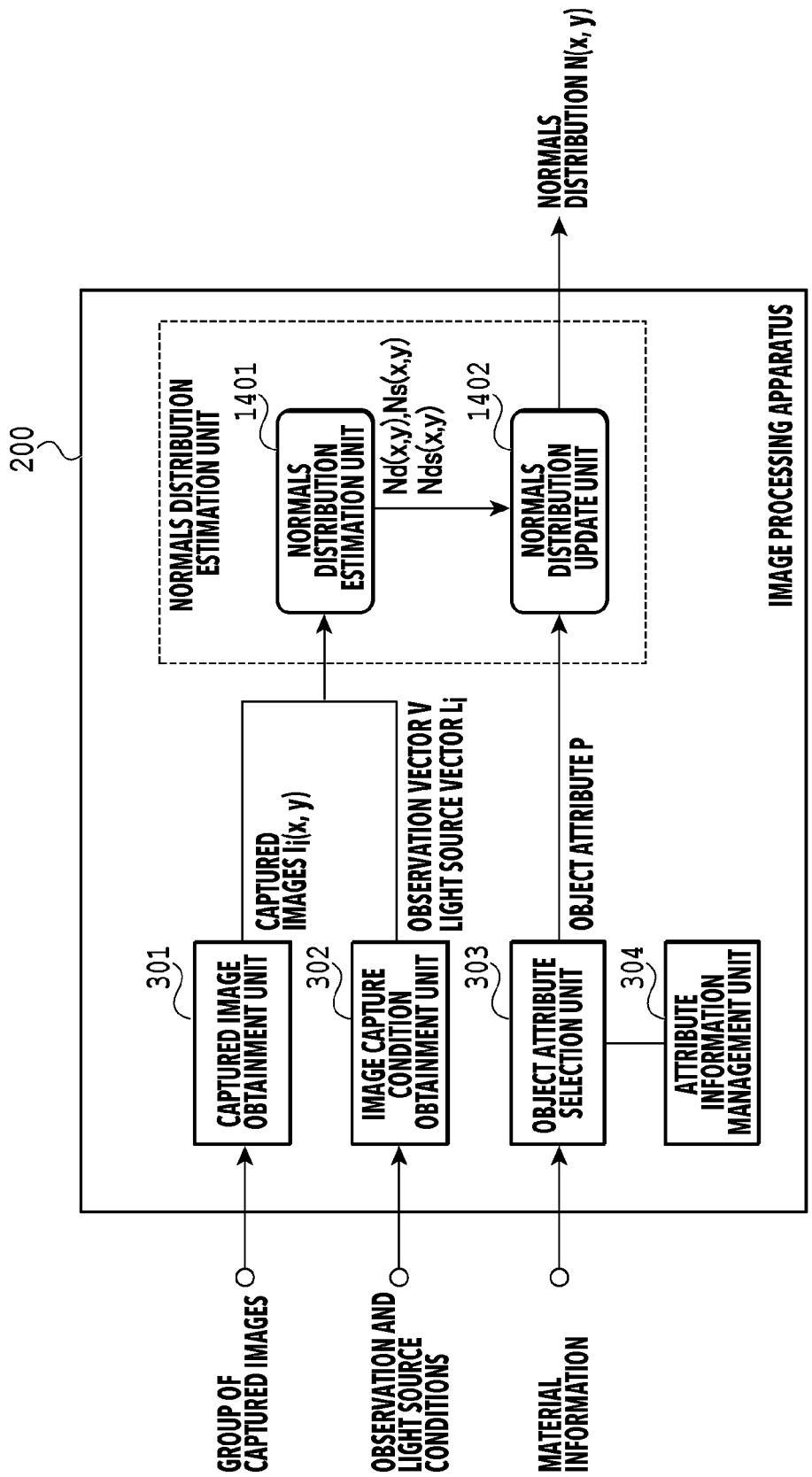
FIG. 14 is a block diagram showing the functional configuration of an image processing apparatus.

FIG. 14 is a block diagram illustrating the functional configuration of the image processing apparatus 200 of the present embodiment. Functional blocks that are the same as those in the image processing apparatus of the first embodiment are denoted by the same numbers as those used in the first embodiment to omit descriptions. The image processing apparatus 200 has the captured image obtainment unit 301, the image capture condition obtainment unit 302, the object attribute selection unit 303, the attribute information management unit 304, a normals distribution estimation unit 1401, and a normals distribution update unit 1402. The normals distribution update unit 1402 updates a normals distribution estimated by the normals distribution estimation unit 1401. Details will be described below.

[Normals distribution Estimation Processing]

Figure 15:
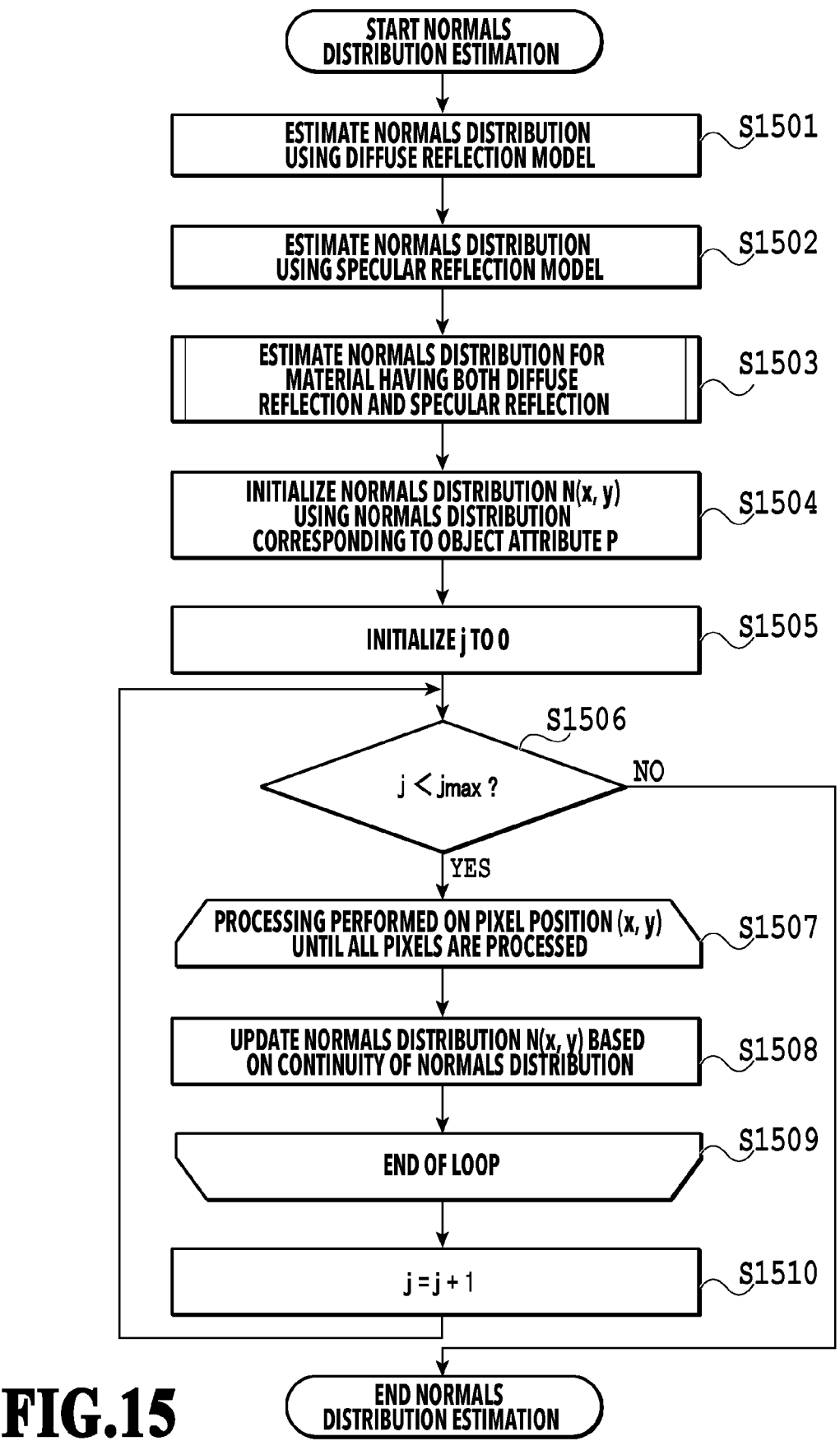
FIG. 15 is a flowchart illustrating details of normals distribution estimation processing.

FIG. 15 is a flowchart illustrating details of normals distribution estimation processing of the present embodiment. FIG. 15 is used to describe details of the normals distribution estimation processing of the present embodiment in S404 in FIG. 4. Note that the processing of S401 to S403 performed by the image processing apparatus of the present embodiment are the same as that performed in the first embodiment.

In S1501, the normals distribution estimation unit 1401 performs normals distribution estimation using a diffuse reflection model. The specific method using a diffuse reflection model is the same as that performed in S703 in the first embodiment and is therefore not described here. A normal vector of each pixel position indicated by the normals distribution estimated by the diffuse reflection model in this step is denoted as $N_d(x, y)$.

In S1502, the normals distribution estimation unit 1401 performs normals distribution estimation using a specular reflection model. The specific method using the specular reflection model is the same as that performed in S704 in the first embodiment and is therefore not described here. A normal vector of each pixel position indicated by the normals distribution estimated by the specular reflection model in this step is denoted as $N_s(x, y)$.

In S1503, the normals distribution estimation unit 1401 performs normals distribution estimation using a model for reflection properties having both diffuse reflection and specular reflection. The specific method is the same as that performed in S705 in the first embodiment and is therefore not described here. A normal vector of each pixel position indicated by the normals distribution estimated by the model for reflection properties having both diffuse reflection and specular reflection in this step is denoted as $N_{ds}(x, y)$.

In S1504, the normals distribution estimation unit 1401 initializes the normal vector $N(x, y)$ of each pixel position on the object using the normals distribution obtained using the reflection model corresponding to the object attribute P selected in S403. Specifically, the normals distribution estimation unit 1401 initializes the normal vector $N(x, y)$ of each pixel position based on Formula (31).

$$N(x, y) = \begin{cases} N_d(x, y) & \text{(when } P = 1\text{)} \\ N_s(x, y) & \text{(when } P = 2\text{)} \\ N_{ds}(x, y) & \text{(when } P = 3\text{)} \end{cases} \quad \text{Formula (31)}$$

In S1505, the normals distribution update unit 1402 initializes a variable j to 0. The variable j is a counter that counts the number of times S1507 and the following steps are executed.

In S1506, the normals distribution update unit 1402 determines whether j is less than $j_{max}$. If j is not less than $j_{max}$ (NO in S1506), the processing of this flowchart ends. The value $j_{max}$ is set to define the number of times to execute the loop processing from S1507 to S1509. If j is less than $j_{max}$ (YES in S1506), processing proceeds to S1507.

The following steps S1507 to S1509 are loop processing, in which the normals distribution estimated based on the object attribute P selected based on the material information is updated for each pixel, which is a unit area, based on the formation of the normals distribution in order to increase the accuracy of the normals distribution estimation.

In S1507, a processing target pixel position (x, y) is selected from the pixel positions of the captured images. Then, the processing of S1508 is performed on the processing target pixel position (x, y). If there is an unprocessed pixel position in S1509, processing proceeds back to S1507 to select the next unprocessed pixel position, thus repeating the processing.

In S1508, the normals distribution update unit 1402 updates the normal vector $N(x, y)$ of the currently processed pixel position (x, y) based on the continuity of the normals distribution. The continuity of the normals distribution is determined based on whether the normal vector of the position which is currently being processed and focused on is similar to the normal vector of an adjacent position. Specifically, a normal vector that minimizes the evaluation formula shown in Formula (32) is selected from $N_d(x, y)$, $N_s(x, y)$, and $N_{d\,s}(x, y)$.

$$\sum_{t=-1}^{1} \sum_{r=-1}^{1} \left(1 - N^T(x, y)N(x+t, y+r)\right)^2 \quad \text{Formula (32)}$$

For example, the following (1) to (3) are calculated based on Formula (32):

$$\Sigma\Sigma(1-N_d^T(x',y')N(x'+t,y'+r)) \quad (1)$$

$$\Sigma\Sigma(1-N_s^T(x',y')N(x'+t,y'+r))^2 \quad (2)$$

$$\Sigma\Sigma(1-N_{d\,s}^T(x',y')N(x'+t,y'+r))^2 \quad (3)$$

where (x', y') is the processing target pixel position, and N(x', y') is the current normal vector of the processing target pixel position. Note that the ranges of t and r in (1) to (3) are the same as those in Formula (32) and are therefore omitted.

Then, for example, in a case where the value obtained by (2) is the smallest among the values obtained by (1) to (3), the normal vector N(x', y') at the processing target pixel position is replaced by NS(x', y') and is thereby updated. In a case where j=0, the normal vector initialized in S1505 is replaced by NS(x', y') and is thereby updated.

Although the continuity of the normals distribution is used to determine the formation of the normals distribution in the method described above, an integrability constraint, which is an integrability condition, may be used. In that case, Formula (33) may be used as an evaluation formula to select a normal vector at each pixel position (x, y) from $N_d(x, y)$, $N_s(x, y)$, and $N_{d\,s}(x, y)$.

$$((N_x(x,y+1)-N_x(x,y))-(N_y(x+1,y)-N_y(x,y))) \quad \text{Formula (33)}$$

In S1510, the normals distribution update unit 1402 increments the variable j by 1. Then, processing proceeds back to S1506. Then, in S1506, the normals distribution update unit 1402 determines whether j is less than $j_{max}$. If j is not less than $j_{max}$ (NO in S1506), the processing of this flowchart ends.

A normal vector in an initial normals distribution is denoted as $N_0(x, y)$, and a normal vector in a normals distribution having undergone the first update processing (the loop processing S1507 to S1509) is denoted as $N_1(x, y)$. In the first update processing, a normal vector of a processing target pixel position is updated by reference to surrounding pixels from $N_0(x, y)$ and selecting a normal vector that minimizes the value obtained by the evaluation formula of Formula (32). However, in a case where a normal vector is selected based on the evaluation formula by reference to the surrounding pixels of the pixel to be processed from $N_1(x, y)$, the same normal vector as the normal vector selected in the first update processing is not necessarily selected. Thus, $j_{max}$ is preferably set to 2 or greater in order for the update processing to be performed repeatedly.

In the present embodiment thus described, a normals distribution obtained by a normals distribution estimation method in accordance with an object attribute selected based on the material of the object can be updated based on the formation of the normals distribution. Thus, according to the present embodiment, a normals distribution can be obtained more accurately.

OTHER EMBODIMENTS

In the embodiments described above, a normals distribution is estimated by fitting of a reflection model corresponding to the material of the object. Alternatively, in a case where a sufficient number of captured images with different image capture conditions can be obtained, a normals distribution may be found based on, for each pixel position, the light source vector corresponding to the captured image with the highest luminance. In this case, in a case where the material of the object has reflection properties exhibiting diffuse reflection, the light source vector corresponding to the captured image with the highest luminance can be used as the normal vector as-is. In a case where the material of the object has reflection properties exhibiting specular reflection, the halfway vector between the observation vector and the light source vector corresponding to the captured image with the highest luminance can be used as the normal vector.

One piece of material information is selected for an object as object information in the embodiments described above. Alternatively, in a case of an object made of a plurality of materials, material information may be set for each region in the object.

In the embodiments described above, a normals distribution is estimated using one of the three normals distribution estimation methods: a method based on diffuse reflection, a method based on specular reflection, a method based on a combination of diffuse reflection and specular reflection. Alternatively, normals distribution estimation may be performed using a different method (reflection model).

According to the technique of the present disclosure, a highly accurate normals distribution can be estimated using a reflection model based on the material of the object.

Embodiment(s) of the present disclosure can also be realized by a computer of a system or apparatus that reads out and executes computer executable instructions (e.g., one or more programs) recorded on a storage medium (which may also be referred to more fully as a non-transitory computer-readable storage medium.) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-091223 filed May 31, 2021, which is hereby incorporated by reference wherein in its entirety.

What is claimed is:

1. An image processing apparatus comprising:
one or more processors; and
a memory storing a program which, when executed by one or more processors, causes the image processing apparatus to:
execute first obtaining processing to obtain a plurality of captured images of an object captured under a plurality of image capture conditions;
execute display controlling processing to perform control of displaying of a screen on a display, the screen being for a user to input information on a material of the object;
execute second obtaining processing to obtain the information on the material; and
execute estimation processing to estimate a distribution of normals of the object based on the plurality of captured images and the information on the material.

2. The image processing apparatus according to claim 1, wherein
the plurality of image capture conditions are different from one another in an angle formed between an observation direction and a light source direction, the observation direction being a direction from the object to an image capturing apparatus, the observation direction being a direction from the object to a light source.

3. The image processing apparatus according to claim 1, wherein the program further causes the image processing apparatus to:
execute selection processing to select a reflection property corresponding to the material, wherein
the estimation processing estimates the distribution of normals using a reflection model based on the selected reflection property.

4. The image processing apparatus according to claim 3, wherein
the selection processing selects the reflection property based on a list associating the reflection property and the information on the material.

5. The image processing apparatus according to claim 1, wherein the program further causes the image processing apparatus to:
update a normal per unit area indicated by the distribution of normals estimated by the estimation processing based on formation of the distribution of normals.

6. The image processing apparatus according to claim 5, wherein
the update processing performs the update based on continuity or an integrability condition of the distribution of normals.

7. The image processing apparatus according to claim 3, wherein
the plurality of captured images are captured by an image capturing apparatus placed to face in a direction toward the object, and
the selection processing calculates a first value based on a diffuse reflection model and a second value based on a specular reflection model based on the plurality of captured images, and selects the reflection property corresponding to the material of the object based on a ratio of the first value and the second value.

8. The image processing apparatus according to claim 7, wherein the program further causes the image processing apparatus to:
execute processing to select, as a pixel of interest, a pixel position a normal to which is in a substantially same direction as a light source direction from an image captured under an image capture condition that the light source direction is substantially same as an observation direction, the light source direction being a direction from the object to a light source, the observation direction being a direction from the object to the image capturing apparatus, wherein
the selection processing calculates the first value and the second value by calculating, based on the pixel of interest, a parameter for the diffuse reflection model for calculating the first value and a parameter for the specular reflection model for calculating the second value.

9. The image processing apparatus according to claim 8, wherein
the pixel selection processing selects the pixel of interest from a captured image of the object captured by an image capturing apparatus having a light emitting unit.

10. The image processing apparatus according to claim 3, wherein
the reflection property selected by the selection processing includes at least a first reflection property which is a reflection property exhibiting diffuse reflection.

11. The image processing apparatus according to claim 10, wherein
in a case where the selection processing selects the first reflection property, the estimation processing determines, from the plurality of captured images, a captured image a processing target pixel in which has a highest luminance, and estimates that a light source direction which is a direction from the object to a light source and is an image capture condition used to obtain the determined captured image is a direction of a normal to a position corresponding to the processing target pixel.

12. The image processing apparatus according to claim 3, wherein
the reflection property selected by the selection processing includes at least a second reflection property which is a reflection property exhibiting specular reflection.

13. The image processing apparatus according to claim 12, wherein
in a case where the selection processing selects the second reflection property, the estimation processing determines, from the plurality of captured images, a captured image a processing target pixel in which has a highest luminance, and estimates that a direction of a halfway vector between a vector indicating a light source direction and a vector indicating an observation direction is a direction of a normal to a position corresponding to the processing target pixel, the light source direction being a direction from the object to a light source and being an image capture condition used to obtain the captured image determined, the observation direction being a direction from the object to an image capturing apparatus.

14. The image processing apparatus according to claim 3, wherein
the reflection property selected by the selection processing includes at least a third reflection property which is a reflection property exhibiting both diffuse reflection and specular reflection.

15. The image processing apparatus according to claim 14, wherein
in a case where the selection processing selects the third reflection property, the estimation processing determines, from the plurality of captured images, a captured image including a luminance regarded as being a luminance based on diffuse reflection, and estimates the distribution of normals based on a diffuse reflection model.

16. The image processing apparatus according to claim 14, wherein
in a case where the selection processing selects the third reflection property, the estimation processing finds, from the plurality of captured images, a luminance regarded as being a luminance based on specular reflection, and estimates the distribution of normals based on a specular reflection model.

17. The image processing apparatus according to claim 1, wherein
the information on the material is a name of the material.

18. An image processing method comprising:
obtaining a plurality of captured images of an object captured under a plurality of image capture conditions;
performing control of displaying of a screen on a display, the screen being for a user to input information on a material of the object;
obtaining the information on the material; and
estimating a distribution of normals of the object based on the plurality of captured images and the information on the material.

19. A non-transitory computer readable storage medium storing a program which causes a computer to perform an image processing method, the image processing method comprising:
obtaining a plurality of captured images of an object captured under a plurality of image capture conditions;
performing control of displaying of a screen on a display, the screen being for a user to input information on a material of the object;
obtaining the information on the material; and
estimating a distribution of normals of the object based on the plurality of captured images and the information on the material.

* * * * *